US012676066B2

(12) United States Patent
Gabriel et al.

(10) Patent No.: US 12,676,066 B2
(45) Date of Patent: Jul. 7, 2026

(54) VEHICLE CONTROL DEVICE

(71) Applicant: HITACHI ASTEMO, LTD.,
Hitachinaka (JP)

(72) Inventors: Daniel Gabriel, Tokyo (JP); Yuki Horita, Tokyo (JP); Shigenori Hayase, Hitachinaka (JP); Tatsuhiko Monji, Hitachinaka (JP)

(73) Assignee: HITACHI ASTEMO, LTD.,
Hitachinaka (JP)

( * ) Notice: Subject to any disclaimer, the term of this patent is extended or adjusted under 35 U.S.C. 154(b) by 64 days.

(21) Appl. No.: 18/833,056

(22) PCT Filed: Aug. 25, 2022

(86) PCT No.: PCT/JP2022/032103
§ 371 (c)(1),
(2) Date: Jul. 25, 2024

(87) PCT Pub. No.: WO2023/149003
PCT Pub. Date: Aug. 10, 2023

(65) Prior Publication Data
US 2025/0157333 A1      May 15, 2025

(30) Foreign Application Priority Data
Feb. 7, 2022      (JP) ................................. 2022-017561

(51) Int. Cl.
*G08G 1/16*          (2006.01)
*B60W 30/09*          (2012.01)
*B60W 60/00*          (2020.01)

(52) U.S. Cl.
CPC .............. *G08G 1/16* (2013.01); *B60W 30/09* (2013.01); *B60W 60/0027* (2020.02); *B60W 2552/10* (2020.02); *B60W 2556/40* (2020.02)

(58) Field of Classification Search
CPC ............... B60W 30/09; B60W 30/095; B60W 30/0953; B60W 60/0027; G08G 1/16
See application file for complete search history.

(56) References Cited

U.S. PATENT DOCUMENTS

| | | | | |
|---|---|---|---|---|
| 2020/0225622 | A1* | 7/2020 | Buerkle | ................... G01S 15/04 |
| 2021/0276574 | A1* | 9/2021 | Efrat Sela | ............. B60W 10/04 |
| 2022/0314968 | A1 | 10/2022 | Horita et al. | |

FOREIGN PATENT DOCUMENTS

| | | |
|---|---|---|
| JP | 2017-084115 A | 5/2017 |
| JP | 6297956 B2 | 3/2018 |

(Continued)

OTHER PUBLICATIONS

International Search Report with English Translation in corresponding International Application No. PCT/JP2022/032103, Nov. 15, 2022.

*Primary Examiner* — Anshul Sood
(74) *Attorney, Agent, or Firm* — Foley & Lardner LLP

(57) ABSTRACT

In the vehicle control device mounted on the vehicle, the information acquisition unit 11 acquires a vehicle information data group representing vehicle information regarding the behavior of the vehicle 2, a road environment data group 32 representing road environment information regarding the environment of the road on which the vehicle 2 is traveling, and a sensor recognition data group 33 representing sensor recognition information regarding the surrounding environment of the vehicle 2 recognized by the external sensor group 4 mounted on the vehicle 2. Based on the road environment data group 32 and the sensor recognition data group 33, the apparent obstacle prediction unit 12 predicts the future behavior of the apparent obstacle that may hinder the traveling of the vehicle 2. The lane risk map generation unit 15 generates a lane risk map representing the collision risk between the vehicle 2 and the obstacle for each lane of (Continued)

the road based on the vehicle information data group 31 and the future behavior of the apparent obstacle predicted by the apparent obstacle prediction unit 12.

6 Claims, 10 Drawing Sheets

(56) References Cited

FOREIGN PATENT DOCUMENTS

| | | | |
|---|---|---|---|
| JP | 6548029 | B2 | 7/2019 |
| JP | 2021-047644 | A | 3/2021 |
| JP | 2021-172264 | A | 11/2021 |
| KR | 10-1503473 | B1 | 3/2015 |

* cited by examiner

FIG. 1

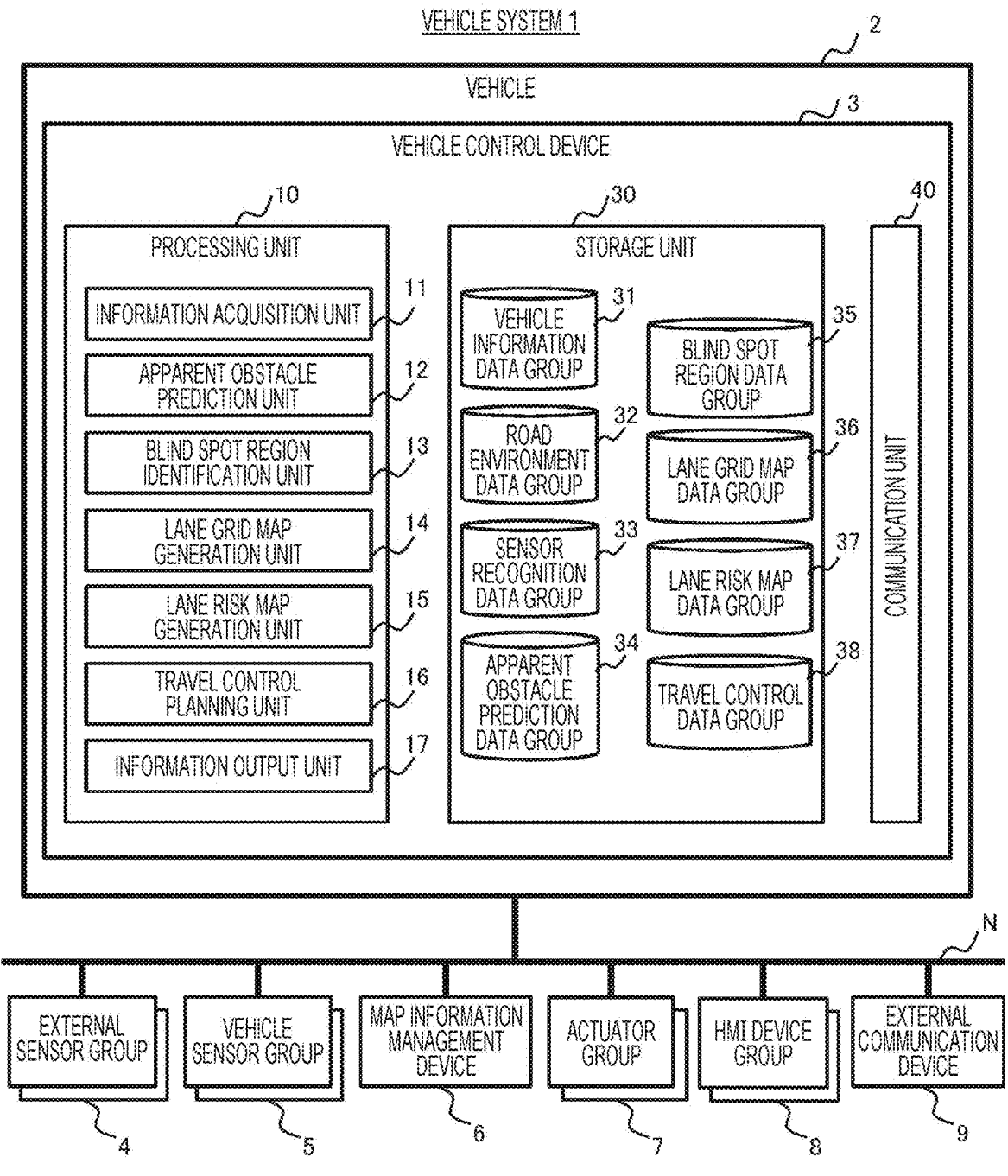

VEHICLE SYSTEM 1

VEHICLE 2

VEHICLE CONTROL DEVICE 3

PROCESSING UNIT 10

INFORMATION ACQUISITION UNIT 11

APPARENT OBSTACLE PREDICTION UNIT 12

BLIND SPOT REGION IDENTIFICATION UNIT 13

LANE GRID MAP GENERATION UNIT 14

LANE RISK MAP GENERATION UNIT 15

TRAVEL CONTROL PLANNING UNIT 16

INFORMATION OUTPUT UNIT 17

STORAGE UNIT 30

VEHICLE INFORMATION DATA GROUP 31

ROAD ENVIRONMENT DATA GROUP 32

SENSOR RECOGNITION DATA GROUP 33

APPARENT OBSTACLE PREDICTION DATA GROUP 34

BLIND SPOT REGION DATA GROUP 35

LANE GRID MAP DATA GROUP 36

LANE RISK MAP DATA GROUP 37

TRAVEL CONTROL DATA GROUP 38

COMMUNICATION UNIT 40

N

EXTERNAL SENSOR GROUP 4

VEHICLE SENSOR GROUP 5

MAP INFORMATION MANAGEMENT DEVICE 6

ACTUATOR GROUP 7

HMI DEVICE GROUP 8

EXTERNAL COMMUNICATION DEVICE 9

FIG. 4

LANE GRID MAP DATA GROUP 36

| LANE ID | ID OF GRID POINT | x-y POSITION INFORMATION OF REFERENCE POINT | |
|---|---|---|---|
| | | x INFORMATION [cm] | y INFORMATION [cm] |
| 0 (L0) | ... | ... | ... |
| | 5(3005) | 1095 | 420 |
| | 6(3006) | 1340 | 440 |
| | 7(3007) | 1685 | 460 |
| | ... | ... | ... |
| 1 (L1) | ... | ... | ... |
| | 5(3105) | 1195 | 20 |
| | 6(3106) | 1490 | 40 |
| | 7(3107) | 1785 | 60 |
| | ... | ... | ... |
| 2 (L2) | ... | ... | ... |
| | 5(3205) | 1295 | −380 |
| | 6(3206) | 1640 | −360 |
| | 7(3207) | 1885 | −340 |
| | ... | ... | ... |

401 402 403

*FIG. 9*
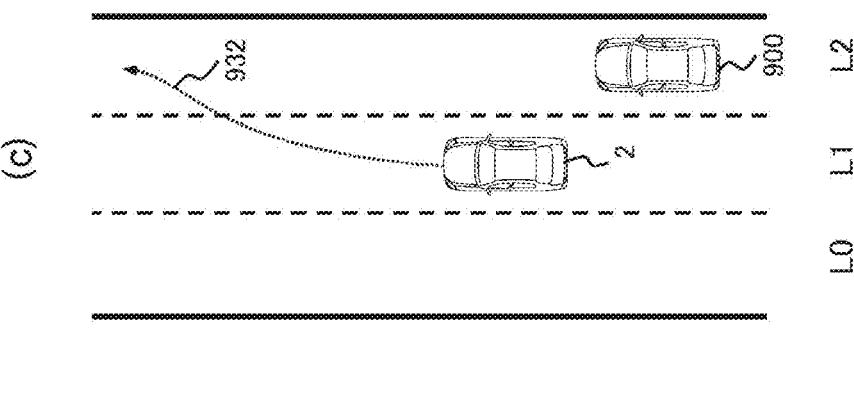
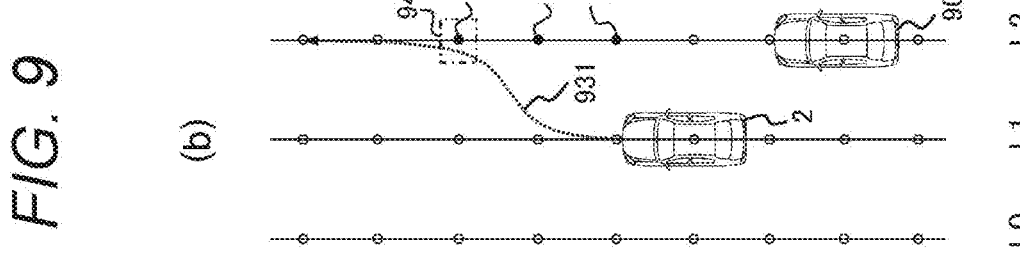
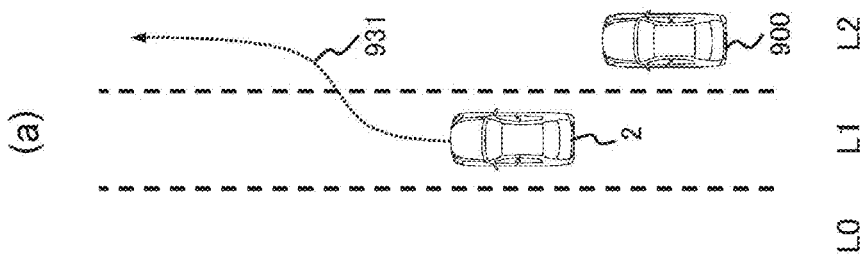

VEHICLE CONTROL DEVICE

TECHNICAL FIELD

The present invention relates to a vehicle control device.

BACKGROUND ART

In recent years, in order to realize comfortable and safe driving support and autonomous driving of a vehicle, there is a demand for a technique for detecting an object around the vehicle, and generating a traveling trajectory of the vehicle so as to avoid a collision between the vehicle and the object according to a relative relationship between the object and the vehicle to control the vehicle. As one of such techniques, a trajectory planning technique has been proposed in which a traveling trajectory of a vehicle is generated for each lane and the vehicle is controlled on the basis of the traveling trajectory to support lane change, merging, and the like of the vehicle. For example, Patent Literature 1 discloses a means for generating a trajectory for moving to a target lane at the time of lane change and generating a lane change trajectory while determining the possibility of collision with a surrounding vehicle.

CITATION LIST

Patent Literature

PTL 1: JP 2017-84115 A

SUMMARY OF INVENTION

Technical Problem

In the invention described in Patent Literature 1, a lane change trajectory is generated by searching for a future trajectory point sequence of a host vehicle that does not overlap with a future trajectory point sequence of each surrounding vehicle. In this method, when the number of surrounding vehicles on the traveling road increases, it is necessary to search for a future trajectory point sequence of the host vehicle that does not overlap while performing collision determination on all future trajectory point sequences of the vehicles one by one. Therefore, in an environment where there are a large number of surrounding vehicles such as a traffic jam or a central street, the amount of calculation at the time of evaluating the traveling trajectory of the host vehicle becomes excessive, and there is a possibility that the immediacy of processing cannot be secured or collision determination cannot be performed for some surrounding vehicles. Therefore, depending on the number of surrounding vehicles, the traveling risk of the host vehicle may not be appropriately evaluated.

Solution to Problem

A vehicle control device according to the present invention is a vehicle control device mounted on a host vehicle, the vehicle control device comprising: an information acquisition unit that acquires vehicle information regarding a behavior of the host vehicle, road environment information regarding an environment of a road on which the host vehicle is traveling, and sensor recognition information regarding a surrounding environment of the host vehicle recognized by a sensor mounted on the host vehicle; an apparent obstacle prediction unit that predicts future behav-ior of an apparent obstacle that may obstruct traveling of the host vehicle on a basis of the road environment information and the sensor recognition information; and a lane risk map generation unit that generates a lane risk map representing a collision risk between the host vehicle and an obstacle for each lane of the road on a basis of the vehicle information and a future behavior of the apparent obstacle predicted by the apparent obstacle prediction unit.

Advantageous Effects of Invention

According to the present invention, the traveling risk of the host vehicle can be appropriately evaluated regardless of the number of surrounding vehicles.

BRIEF DESCRIPTION OF DRAWINGS

FIG. 1 is a functional block diagram illustrating a configuration of a vehicle system including a vehicle control device according to an embodiment of the present invention.

FIG. 4 is a diagram illustrating an example of a lane grid map data group.

FIG. 9 is a diagram illustrating a specific example of trajectory generation, evaluation, and correction.

DESCRIPTION OF EMBODIMENTS

Figure 2:
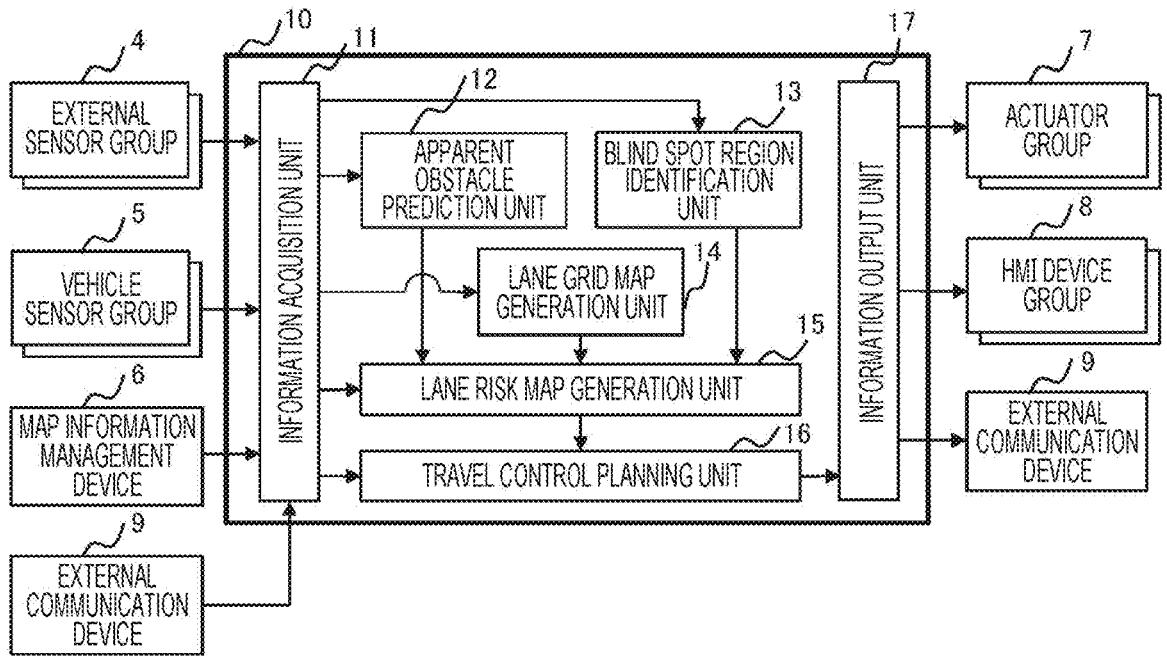
FIG. 2 is a diagram illustrating a correlation of processing executed in the vehicle control device.

Hereinafter, embodiments of the present invention will be described with reference to the drawings.
(System Configuration)

FIG. 1 is a functional block diagram illustrating a configuration of a vehicle system 1 including a vehicle control device 3 according to an embodiment of the present invention. The vehicle system 1 is mounted on a vehicle 2. The vehicle system 1 checks the situation of traveling roads and obstacles such as surrounding vehicles around the vehicle 2, and then performs appropriate driving support and travel control. As illustrated in FIG. 1, the vehicle system 1 includes a vehicle control device 3, an external sensor group 4, a vehicle sensor group 5, a map information management device 6, an actuator group 7, an HMI device group 8, and an external communication device 9. The vehicle control device 3, the external sensor group 4, the vehicle sensor group 5, the map information management device 6, the actuator group 7, the HMI device group 8, and the external communication device 9 are connected to each other by an in-vehicle network N. Hereinafter, the vehicle 2 may be referred to as a "host vehicle" 2 in order to be distinguished from other vehicles.

The vehicle control device 3 is an electronic control unit (ECU) that is mounted on the vehicle 2 and performs arithmetic processing for performing driving support and travel control of the vehicle 2. The vehicle control device 3 generates travel control information for driving support or autonomous driving of the vehicle 2 on the basis of various input information provided from the external sensor group 4, the vehicle sensor group 5, the map information management device 6, the external communication device 9, and the like, and outputs the travel control information to the actuator group 7 and the HMI device group 8.

The external sensor group 4 is an assembly of devices that detect a state around the vehicle 2. The external sensor group 4 corresponds to, for example, various sensors such as a camera device, a millimeter wave radar, LiDAR, and sonar. The external sensor group 4 detects environmental elements such as obstacles, road marks, signs, and signals around the vehicle 2, and outputs these detection results to the vehicle control device 3 via the in-vehicle network N. Here, the external sensor group 4 cannot necessarily detect all obstacles existing around the vehicle 2, and cannot detect an obstacle or the like hidden in a blind spot of the vehicle 2. Hereinafter, an obstacle that can be detected by the external sensor group 4 and can be an obstacle to traveling of the vehicle 2 is referred to as an "apparent obstacle". On the other hand, a potential obstacle that cannot be detected by the external sensor group 4, is hidden in a blind spot, and may jump out toward the vehicle 2 is referred to as a "potential obstacle". Both the apparent obstacle and the potential obstacle may be simply referred to as an "obstacle". These obstacles include, for example, other vehicles other than the vehicle 2, pedestrians, falling objects on roads, road edges, and the like. The "road marks" are, for example, a white line, a crosswalk, a stop line, and the like drawn on a road surface. Furthermore, the external sensor group 4 may also output information regarding the detection state of each environmental element to the vehicle control device 3 via the in-vehicle network N on the basis of its own sensing range and its state.

The vehicle sensor group 5 is an assembly of devices that detect various states of the vehicle 2. Each vehicle sensor detects, example, position information, a traveling speed, a steering angle, an operation amount of an accelerator, an operation amount of a brake, and the like of the vehicle 2, and outputs the detected information to the vehicle control device 3 via the in-vehicle network N.

The map information management device 6 is a device that manages and provides digital map information around the vehicle 2. The map information management device 6 includes, for example, a navigation device or the like. The map information management device 6 includes, for example, digital road map data of a predetermined area including the periphery of the vehicle 2, and is configured to identify the current position of the vehicle 2 on the map, that is, the road or lane on which the vehicle 2 is traveling, based on position information of the vehicle 2 output from the vehicle sensor group 5 and the like. In addition, the identified current position of the vehicle 2 and map data around the current position are output to the vehicle control device 3 via the in-vehicle network N.

The actuator group 7 is a device group that controls control elements as steering, a brake, and an accelerator that determine the movement of the vehicle 2. The actuator group 7 controls the behavior of the vehicle 2 by controlling the movement of control elements such as steering, braking, and acceleration on the basis of operation information of a steering wheel, a brake pedal, an accelerator pedal, and the like by the driver and a control command value output from the vehicle control device 3.

The HMI device group 8 is a device group for inputting information from the driver or the occupant to the vehicle system 1 and notifying the driver or the occupant of information from the vehicle system 1. The HMI device group 8 includes a display, a speaker, a vibrator, a switch, and the like.

The external communication device 9 is a communication module that performs wireless communication with the outside of the vehicle system 1. The external communication device 9 is configured to be able to communicate with, for example, a center (not illustrated) that provides and distributes services to the vehicle system 1 and the Internet.

The vehicle control device 3 includes a processing unit 10, a storage unit 30, and a communication unit 40.

The processing unit 10 includes, for example, a central processing unit (CPU) which is a central processing unit. However, in addition to the CPU, a graphics processing unit (GPU), a field-programmable gate array (FPGA), an application specific integrated circuit (ASIC), or the like may be included, or any one of them may be included.

The processing unit 10 includes, as functions thereof, an information acquisition unit 11, an apparent obstacle prediction unit 12, a blind spot region identification unit 13, a lane grid map generation unit 14, a lane risk map generation unit 15, a travel control planning unit 16, and an information output unit 17. The processing unit 10 realizes these by executing a predetermined operation program stored in the storage unit 30.

The information acquisition unit 11 acquires various types of information from other devices connected to the vehicle control device 3 via the in-vehicle network N, and stores the information in the storage unit 30. For example, information regarding an apparent obstacle around the vehicle 2 and a detection area of the external sensor group 4 detected by the external sensor group 4 is acquired and stored in the storage unit 30 as a sensor recognition data group 33 regarding the surrounding environment of the vehicle 2. In addition, information such as the movement and state of the vehicle 2 detected by the vehicle sensor group 5 and the like is acquired and stored in the storage unit 30 as a vehicle information data group 31 related to the behavior of the vehicle 2. Further, information related to the road on which the vehicle 2 is traveling is acquired from the map information management device 6, the external communication device 9, and the like, and is stored in the storage unit 30 as a road environment data group 32 related to the environment of the road on which the vehicle 2 is traveling.

The apparent obstacle prediction unit 12 predicts the future behavior of the apparent obstacle around the vehicle 2 on the basis of the road environment data group 32 and the sensor recognition data group 33 acquired by the information acquisition unit 11. For example, it is assumed that the apparent obstacle travels along the current traveling lane, and the future position and speed of the apparent obstacle are predicted using lane information indicated by the road environment data group 32. The prediction result of the behavior of the apparent obstacle by the apparent obstacle prediction unit 12 is stored in the storage unit 30 as an apparent obstacle prediction data group 34.

On the basis of the information of the detection region of the external sensor group 4 included in the sensor recognition data group 33 acquired by the information acquisition unit 11, the blind spot region identification unit 13 identifies, around the vehicle 2, a blind spot region that is not included in the detection range of the external sensor group 4 and thus cannot be recognized by the external sensor group 4 around the vehicle 2. In the sensor recognition data group 33, for example, the detection region of the external sensor group 4 itself may be expressed by a grid-like map expression such as an occupancy grid map (OGM), or information necessary for identifying the detection region, such as a set of a detection range (angle, distance, etc.) and detection information of the external sensor group 4, may be expressed. The detection information of the external sensor group 4 is, for example, point group data acquired by light detection and ranging (LiDAR), radio detection and ranging (RADAR), or the like constituting the external sensor group 4. Information on the blind spot region identified by the blind spot region identification unit 13 is stored in the storage unit 30 as a blind spot region data group 35.

The lane grid map generation unit 14 generates a lane grid map along the road shape of the vehicle 2 currently traveling on the basis of the vehicle information data group 31 and the road environment data group 32 acquired by the information acquisition unit 11. The lane grid map is a grid-like representation of the state of each position when each lane of the road is divided by a predetermined distance unit in the extension direction along the shape of the road on which the vehicle 2 is traveling, and is, for example, a grid-like map. The information of the lane grid map generated by the lane grid map generation unit 14 is stored in the storage unit 30 as a lane grid map data group 36.

The lane risk map generation unit 15 generates a lane risk map regarding roads around the vehicle 2 on the basis of the vehicle information data group 31 acquired by the information acquisition unit 11, the apparent obstacle prediction data group 34 generated by the apparent obstacle prediction unit 12, and the lane grid map data group 36 generated by the lane grid map generation unit 14. The lane risk map represents, for each lane, a collision risk between the vehicle 2 and an obstacle, including a collision risk for an apparent obstacle around the vehicle 2 and a collision risk for a potential obstacle that may jump out from a blind spot region toward the vehicle 2. In the lane risk map, the risk state for each position in the extension direction of each lane is expressed using the lane grid map generated by the lane grid map generation unit 14. Information of the lane risk map generated by the lane risk map generation unit 15 is stored in the storage unit 30 as a lane risk map data group 37.

The travel control planning unit 16 determines a planned trajectory of the vehicle 2 by planning a trajectory on which the vehicle 2 should travel on the basis of the lane risk map or the like generated by the lane risk map generation unit 15, and determines a control command value of the actuator group 7 for controlling the vehicle 2 to follow the planned trajectory. Information on the planned trajectory determined by the travel control planning unit 16 and the control command value of the actuator group 7 is stored in the storage unit 30 as a travel control data group 38.

The information output unit 17 outputs various types of information to other devices connected to the vehicle control device 3 via the in-vehicle network N. For example, a control command value included in the travel control data group 38 is output to the actuator group 7 to control the travel of the vehicle 2. In addition, for example, information of the sensor recognition data group 33 and the lane risk map data group 37, information of the planned trajectory included in the travel control data group 38, and the like are output to the HMI device group 8 and presented to the occupant of the vehicle 2. As a result, in the vehicle 2 during autonomous driving, how the vehicle system 1 interprets the surrounding travel environment (display apparent obstacle represented by sensor recognition data group 33 and lane risk map represented by lane risk map data group 37), and what kind of travel is planned (display of the planned trajectory indicated by the travel control data group 38) can be presented to the occupant.

The storage unit 30 includes, for example, a storage device such as a hard disk drive (HDD), a flash memory, and a read only memory (ROM), and a memory such as a random access memory (RAM). The storage unit 30 stores a program to be processed by the processing unit 10, a data group necessary for the processing, and the like. In addition, as a main storage when the processing unit 10 executes the program, it is also used for temporarily storing data necessary for operation of the program. In the present embodiment, as information for implementing the functions of the vehicle control device 3, a vehicle information data group 31, a road environment data group 32, a sensor recognition data group 33, an apparent obstacle prediction data group 34, a blind spot region data group 35, a lane grid map data group 36, a lane risk map data group 37, a travel control data group 38, and the like are stored in the storage unit 30.

The vehicle information data group 31 is a set of data related to the behavior of the vehicle 2 detected by the vehicle sensor group 5 and the like. The data related to the behavior of the vehicle 2 is information indicating the movement, state, and the like of the vehicle 2, and includes, for example, information such as the position, traveling speed, steering angle, accelerator operation amount, brake operation amount, traveling route, and the like of the vehicle 2.

The road environment data group 32 is a set of data related to the road environment around the vehicle 2. The data on the road environment is information on roads around the vehicle 2 including the road on which the vehicle 2 is traveling. This includes, for example, information regarding shapes and attributes (traveling direction, speed limit, traveling limit, etc.) of lanes constituting roads around the vehicle 2, traffic signal information, traffic information regarding traffic conditions (average speed and the like) of each road and lane, statistical knowledge information based on past cases, and the like. Static information such as shapes and attributes of roads and lanes is included in, for example, map information acquired from the map information management device 6 or the like. On the other hand, quasi-dynamic or dynamic information such as signal information, traffic information, and statistical knowledge information is acquired via the external communication device 9. The statistical knowledge information includes, for example, information on a geographical location and a time zone where there are many accident cases, and an accident type. Note that the road environment data group 32 may not include all these pieces of information.

The sensor recognition data group 33 is a set of detection information by the external sensor group 4 or data regarding a detection state. The detection information is, for example, information regarding environmental elements such as an apparent obstacle, a road marking, a sign, and a signal around the vehicle 2 identified by the external sensor group 4 on the basis of the sensing information, or sensing information itself (point group information such as millimeter wave radar, LiDAR, and sonar, camera image, parallax image of stereo camera, and the like) around the vehicle 2 acquired by the external sensor group 4. The detection information of the apparent obstacle may include, for example, relative position information of the apparent obstacle with respect to the vehicle 2 detected by the external sensor group 4, information obtained by calculating a movement direction, a movement speed, an acceleration, and the like of the apparent obstacle obtained by continuously detecting a plurality of frames when the apparent obstacle is a moving object, a type label (pedestrian, vehicle, etc.) of the apparent obstacle identified by a predetermined recognition algorithm from point group information of LiDAR, and the like. The information regarding the detection state is information indicating the region detected by the sensor and the accuracy thereof, and includes, for example, a grid-like map such as an OGM.

The apparent obstacle prediction data group 34 is a set of information on the future behavior of each apparent obstacle detected by the external sensor group 4 and predicted by the apparent obstacle prediction unit 12. The information on the future behavior of the apparent obstacle includes, for example, information on the traveling state (position, traveling direction, traveling speed, and the like) of the apparent obstacle every certain time in a period from the present to a few seconds later. The apparent obstacle prediction data group 34 is generated and stored by the apparent obstacle prediction unit 12 based on the road environment data group 32 and the sensor recognition data group 33 acquired by the information acquisition unit 11.

The blind spot region data group 35 is a set of data related to a blind spot region that means a region that is not included in the detection range of the external sensor group 4 around the vehicle 2, that is, a region where the external sensor group 4 has not detected sensing information. An expression example of data regarding the blind spot region will be described later with reference to FIG. 7. The blind spot region data group 35 is generated and stored by the blind spot region identification unit 13 on the basis of the information of the sensor recognition data group 33 acquired by the information acquisition unit 11.

The lane grid map data group 36 is a set of data representing each position in the extension direction of each lane of the road on which the vehicle 2 is traveling. The lane grid map data group 36 is expressed by, for example, a grid-like map set at predetermined intervals for each lane. An example of the lane grid map data group 36 will be described later with reference to FIG. 4. The lane grid map data group 36 is generated and stored by the lane grid map generation unit 14.

The lane risk map data group 37 is a set of data for each lane expressing a region having a high risk for traveling of the vehicle 2. In the lane risk map data group 37, for example, the current or future occupation state of the obstacle at each position indicated by the lane grid map data group 36, the sensing state (blind spot region information or the like) of each position acquired by the external sensor group 4, the level of risk for traveling of the vehicle 2 determined in consideration of the state of the vehicle 2 or the like is expressed by a grid-like map or the like set at predetermined intervals for each lane. The lane risk map data group 37 is generated and stored by the lane risk map generation unit 15.

The travel control data group 38 is a data group related to plan information for controlling the travel of the vehicle 2, and includes a planned trajectory of the vehicle 2, a control command value output to the actuator group 7, and the like. These pieces of information in the travel control data group 38 are generated and stored by the travel control planning unit 16.

The communication unit 40 has a communication function with other devices connected via the in-vehicle network N. The communication function of the communication unit 40 is used when the information acquisition unit 11 acquires various types of information from other devices via the in-vehicle network N or when the information output unit 18 outputs various types of information to other devices via the in-vehicle network N. The communication unit 40 includes, for example, a network card or the like conforming to a communication standard such as IEEE802.3 or a controller area network (CAN). The communication unit 40 transmits and receives data between the vehicle control device 3 and other devices in the vehicle system 1 on the basis of various protocols.

In the present embodiment, the communication unit 40 and the processing unit 10 are described separately, but a part of the processing of the communication unit 40 may be executed in the processing unit 10. For example, it may be configured such that a device corresponding to a hardware device in the communication processing is located in the communication unit 40, and other device driver groups, communication protocol processing, and the like are located in the processing unit 10.

(System Operation)

Next, the operation of the vehicle system 1 of the present embodiment will be described with reference to FIGS. 2 to 10.

The vehicle control device 3 determines a collision risk with respect to each apparent obstacle present on a surrounding lane of the vehicle 2 and a jumping out risk of a potential obstacle in each blind spot region present on the surrounding lane on the basis of information acquired from the external sensor group 4 and the like, and generates a lane risk map in which these determination results are mapped. Then, a planned trajectory of the vehicle 2 is set using the generated lane risk map, and a control command value for performing travel control of the vehicle 2 is generated and output to the actuator group 7. The actuator group 7 controls each actuator of the vehicle 2 in accordance with the control command value output from the vehicle control device 3. Thus, the travel control of the vehicle 2 is realized. In addition, the vehicle control device 3 generates HMI information as information to be notified to the driver and the occupant and outputs the HMI information to the HMI device group 8 in the travel control of the vehicle 2. As a result, it is possible to cause the driver to recognize a risk in traveling to urge safe driving and to present the state of the vehicle system 1 during automatic traveling to the driver or the occupant.

FIG. 2 is a diagram illustrating a correlation of processing executed in the vehicle control device 3. The vehicle control device 3 is configured such that, for example, the processing of the information acquisition unit 11, the apparent obstacle prediction unit 12, the blind spot region identification unit 13, the lane grid map generation unit 14, the lane risk map generation unit 15, the travel control planning unit 16, and the information output unit 17 illustrated in FIG. 1 is executed in the order illustrated in FIG. 2. The series of processing is periodically executed, for example, every 100 ms.

The information acquisition unit 11 acquires necessary information from other devices via the in-vehicle network N and stores the acquired information in the storage unit 30. Specifically, the information of the vehicle information data group 31 is acquired from the vehicle sensor group 5, the information of the road environment data group 32 is acquired from the map information management device 6 and the external communication device 9, and the information of the sensor recognition data group 33 is acquired from the external sensor group 4, and these pieces of information are stored in the storage unit 30 and delivered to a processing unit in a subsequent stage.

The apparent obstacle prediction unit 12 predicts future information on an apparent obstacle around the vehicle 2 on the basis of the road environment data group 32 and the sensor recognition data group 33 acquired by the information acquisition unit 11, stores the apparent obstacle prediction data group 34 based on the prediction result in the storage unit 30, and delivers the data to the lane risk map generation unit 15. Here, the predicted future information on the apparent obstacle includes, for example, a set of future travel information (position, traveling direction, traveling speed, and the like) on the apparent obstacle at regular time intervals in a period from the present to a few seconds later. The future information of the apparent obstacle can be obtained, for example, by identifying the traveling lane of the apparent obstacle on the basis of the representative information (for example, a lane center line or the like) of the lane shape included in the road environment data group 32 and the position information of the apparent obstacle included in the sensor recognition data group 33, and predicting the position, traveling direction, traveling speed, and the like of the apparent obstacle along the representative information of the lane shape.

The blind spot region identification unit 13 performs processing of generating the blind spot region data group 35 on the basis of the sensor recognition data group 33 acquired by the information acquisition unit 11, stores the processing result in the storage unit 30, and delivers the processing result to the lane risk map generation unit 15. At this time, in a case where the sensor recognition data group 33 includes information corresponding to the blind spot region data group 35, that is, information indicating a region where the external sensor group 4 has not detected sensing information (for example, the OGM), it is possible to generate the blind spot region data group 35 by applying necessary correction (coordinate conversion, time correction, etc.) to the information. On the other hand, in a case where the sensor recognition data group 33 includes only the information on the state detected by the external sensor group 4 for each predetermined processing cycle, for example, only the detection range (angle, distance, etc.) and the detection information, it is desirable to generate the current blind spot region data group 35 by estimating the detection state having the highest probability in combination with the blind spot region data group 35 generated in the previous processing cycle and determining the blind spot region from the estimation result.

The lane grid map generation unit 14 performs processing of generating a lane grid map along the shape of the road on which the vehicle 2 is currently traveling on the basis of the vehicle information data group 31 and the road environment data group 32 acquired by the information acquisition unit 11, stores a lane grid map data group 36 representing the processing result in the storage unit 30, and delivers the data to the lane risk map generation unit 15. For example, with a lane on which the vehicle 2 is currently traveling as a reference lane and a lane (adjacent lane or the like) on a road other than the lane on which the vehicle 2 is currently traveling as another lane, the lane grid map is set for these lanes. Specifically, for example, the grid map of the reference lane is generated on the basis of a predetermined interval in the extension direction of the reference lane. On the other hand, the grid map of the other lane is generated on the basis of the grid map of the reference lane. A specific example of the lane grid map generation by the lane grid map generation unit 14 will be described later with reference to FIG. 3.

The lane risk map generation unit 15 performs processing of evaluating a collision risk in each lane with respect to an obstacle around the vehicle 2 on the basis of the vehicle information data group 31 acquired by the information acquisition 11, the apparent obstacle prediction data group 34 generated by the apparent obstacle prediction unit 12, the blind spot region data group 35 generated by the blind spot region identification unit 13, and the lane grid map data group 36 generated by the lane grid map generation unit 14, and generating a lane risk map representing the evaluation result. The lane risk map is expressed by a map including a risk that the vehicle 2 collides with an apparent obstacle detected by the external sensor group 4 and a risk that the vehicle 2 may collide with a potential obstacle jumping out at a high speed from a blind spot region of the external sensor group 4. The lane risk map generation unit 15 stores a lane risk map data group 37 based on the generated lane risk map in the storage unit 30 and delivers the data to the travel control planning unit 16. Specific examples of the lane risk map generation by the lane risk map generation unit 15 will be described later with reference to FIGS. 6 (lane collision risk map) and 7 (lane jumping risk map).

The travel control planning unit 16 plans a travel control trajectory of the vehicle 2 on the basis of the lane risk map data group 37 generated by the lane risk map generation unit 15, the vehicle information data group 31, the road environment data group 32, the sensor recognition data group 33, and the like acquired by the information acquisition unit 11, and generates a control command value or the like for following the trajectory. Then, processing of generating the travel control data group 38 from the generated planned trajectory and control command value of the vehicle 2 is performed. The travel control planning unit 16 stores the generated travel control data group 38 in the storage unit 30 and delivers the data to the information output unit 17. A specific example of the travel control plan by the travel control planning unit 16 will be described later with reference to FIGS. 9 and 10.

The information output unit 17 outputs the control command value to the actuator group 7 on the basis of the travel control data group 38 generated by the travel control planning unit 16. In addition, based on the sensor recognition data group 33 acquired by the information acquisition unit 11, the lane risk map data group 37 generated by the lane risk map generation unit 15, the travel control data group 38 generated by the travel control planning unit 16, and the like, information for presenting a travel environment and a planned trajectory around the vehicle 2 to the occupant is output to the HMI device group 8, and the information is notified to the driver and the occupant.

(Generation Example of Lane Grid Map)

Figure 3:
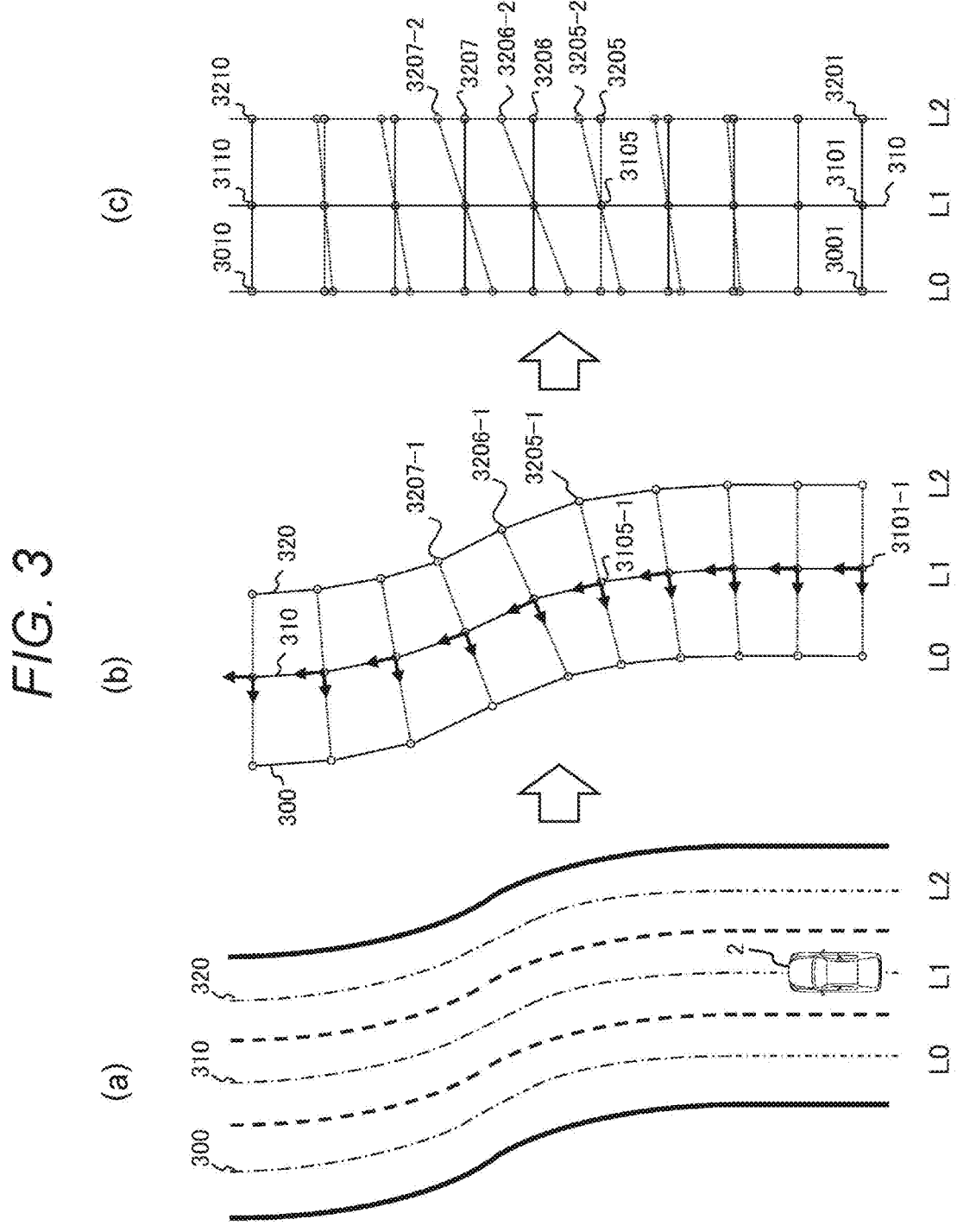
FIG. 3 is an explanatory diagram of lane grid map generation processing.

FIG. 3 is an explanatory diagram of lane grid map generation processing performed by the lane grid map generation unit 14. FIG. 3(*a*) is a diagram illustrating an example of a road shape on which the vehicle 2 travels, and FIG. 3(*b*) is a diagram illustrating a concept of reference points used for generating a lane grid map in accordance with the road shape of FIG. 3(*a*). FIG. 3(*c*) is a diagram illustrating an example of a lane grid map generated on the basis of the reference points illustrated in FIG. 3(*b*).

In the example illustrated in FIG. 3(*a*), the road on which the vehicle 2 is traveling includes three lanes (L0 to L2), and the vehicle 2 travels in the middle lane L1. Curved lines 300, 310, and 320 indicate center lines of the lanes L0 to L2, respectively. In this figure, there is an S-shaped curve on the road in front of the vehicle 2. The concept of generating a lane grid map based on the road shape, the position of the vehicle 2, and the like will be described with reference to FIGS. 3(*b*) and 3(*c*).

First, as illustrated in FIG. 3(*b*), a plurality of reference points corresponding to the lane L1 is set at predetermined distance unit intervals along the extension direction of the road on the center line 310 of the lane L1 on which the vehicle 2 is traveling. In the following description, the reference point of the lane L1 on which the vehicle 2 is traveling may be referred to as a "representative point". Specifically, for example, a point closest to the vehicle 2 on the center line 310 of the lane L1 is obtained and set as an initial representative point 3101-1. Subsequently, a point at a predetermined distance unit, for example, 300 cm ahead of the initial representative point 3101-1 along the center line 310 is set as the next representative point. By repeating this predetermined number of times, a plurality of representative points are set at equal intervals for the lane L1. The distance between the representative points is not limited to 300 cm, and may be set to several tens of cm, for example. In addition, since the range of the extension direction in which the lane grid map can be expressed is determined based on the number of set representative points, for example, the number of representative points may be determined according to the sensor detection capability of the vehicle 2.

Next, a reference point with respect to another lane on the traveling road of the vehicle 2 is obtained based on each representative point set for the lane L1. For example, a direction orthogonal to the extension direction of the lane L1 at each representative point is obtained, and intersections of the orthogonal direction and the center lines 300 and 310 of the remaining lanes L0 and L2 are calculated, whereby a plurality of reference points can be set for the lanes L0 and L2, respectively.

When the plurality of reference points (including representative points) can be set for each lane of the traveling road of the vehicle 2 as described above, the position information of each reference point is stored as the position information of each grid point of the lane grid map.

Next, as illustrated in FIG. 3(*c*), each reference point obtained by the processing of FIG. 3(*b*) is mapped on the lane grid map. Note that the lane grid map is expressed by an extension direction of each lane and an orthogonal direction orthogonal to the extension direction, which is different from the original road shape. That is, since the lane grid map is created for the purpose of representing the state of each position on each lane in the extension direction of the road regardless of the shape of the road on which the vehicle 2 actually travels, an expression like a grid-like map without a curve is used as illustrated in FIG. 3(*c*). For example, each grid point corresponding to the lane L2 in the lane grid map is a point 3201 to 3210 (each point indicated by a solid circle) in FIG. 3(*c*).

By performing the lane grid map generation processing described above, the lane grid map generation unit 14 can generate the lane grid map as illustrated in FIG. 3(*c*) having a plurality of grid points set at equal intervals on a plurality of straight lines representing each lane of the traveling road by setting a plurality of representative points or reference points for each lane of the traveling road of the vehicle 2 and mapping these points in a grid pattern. Note that the lane grid map generation processing described with reference to FIG. 3 is hereinafter referred to as "normalization processing".

Each point on the lanes L0 and L2 indicated by dotted circles in FIG. 3(*c*) indicates a position on the lane grid map corresponding to each reference point in FIG. 3(*b*). For example, a point 3205-2 on the lane L2 indicates the position on the lane grid map of the reference point 3205-1 shown in FIG. 3(*b*). The position of this point 3205-2 is different from the position of the grid point 3205 in the lane grid map.

In the process of mapping each reference point in FIG. 3(*b*) to the lane grid map, the original position information of each reference point is stored as part of the information of the corresponding grid point of the lane grid map. For example, the position information of the representative point 3105-1 on the lane L1 is stored as the information of the grid point 3105, and the position information of the reference point 3205-1 on the lane L2 is stored as the information of the grid point 3205. As described above, the position information of all the reference points is stored in the storage unit 30 as the lane grid map data group 36 in association with each grid point of the lane grid map. An example of a data format of the lane grid map data group 36 will be described later with reference to FIG. 4.

Here, in the process of mapping the reference point to the lane grid map, the distance in the extension direction between the grid points of the lane grid map may be different from the distance in the extension direction of each lane in the actual road shape due to the difference in the path length between the lanes according to the curve of the road. For example, as illustrated in FIG. 3(*c*), in the lane grid map, the distance between the grid point 3205 and the grid point 3206 is the same as the distance between the grid point 3206 and the grid point 3207. On the other hand, the distance between the respective points on the original road corresponding to these respective points, that is, the distance between the point 3205-2 and the point 3206-2, and the distance between the point 3206-2 and the point 3207-2, which are shown for reference in FIG. 3(*c*), are different and not identical. This is because, in the lane grid map, each grid point is set at a constant interval, but in an actual road, the distance in the extension direction varies for each lane depending on the shape of the road.

In the vehicle control device 3 of the present embodiment, a plurality representative points or reference points are set for each lane of the traveling road of the vehicle 2 by performing the normalization processing as described above in the lane grid map generation processing performed by the lane grid map generation unit 14. Then, the position information of each reference point is stored in association with each of a plurality of grid points arranged in a grid pattern, and a lane grid map is generated. As a result, the interval between the positions on each lane of the road corresponding to each of the plurality of grid points of the lane grid map can be changed for each lane according to the difference in the path length between the lanes due to the difference in the shape of each lane.

When the lane risk map is generated from the lane grid map in the lane risk map generation unit 15, it is necessary to consider a distance deviation between grid points caused by the normalization processing. The content of the processing performed in consideration of the distance deviation at the time of generating the lane risk map will be described later in the description of FIG. 5.

(Example of Lane Grid Map Data Group)

FIG. 4 illustrates an example of the lane grid map data group 36. The lane grid map data group 36 in FIG. 4 includes, for example, a lane ID 401 which is an identifier of a lane, an ID 402 of a grid point, and x-y position information 403 of a reference point.

In the lane grid map data group 36 of FIG. 4, as described above with reference to FIGS. 3(*b*) and 3(*c*), the x-y coordinate values representing the position information on the original map of the reference point (the representative point in the case of the lane on which the vehicle 2 is traveling) obtained on each lane is associated with each corresponding grid point. For example, as illustrated in FIGS. 3(*b*) and 3(*c*), the position of the representative point 3105-1 corresponding to the grid point 3105 is shifted to the left with respect to the current position of the vehicle 2. Therefore, in the lane grid map data group 36 of FIG. 4, the position information of the y coordinate stored in association with the grid point 3105 is shifted from the position of the vehicle 2 by 20 cm. In this example, the position ahead (traveling direction) of the current position of the vehicle 2 is represented by an x coordinate value, and the position in the side (direction orthogonal to the traveling direction) is represented by a y coordinate value. Therefore, the y-coordinate value of the reference point on the left side of the current position of the vehicle 2 becomes a positive value, and the y-coordinate value of the reference point on the right side of the current position of the vehicle 2 becomes a negative value. In addition, a positive value on the x coordinate represents the front of the vehicle 2, and a negative value represents the rear of the vehicle 2.

(Flow of Lane Risk Map Generation Processing)

Figure 5:
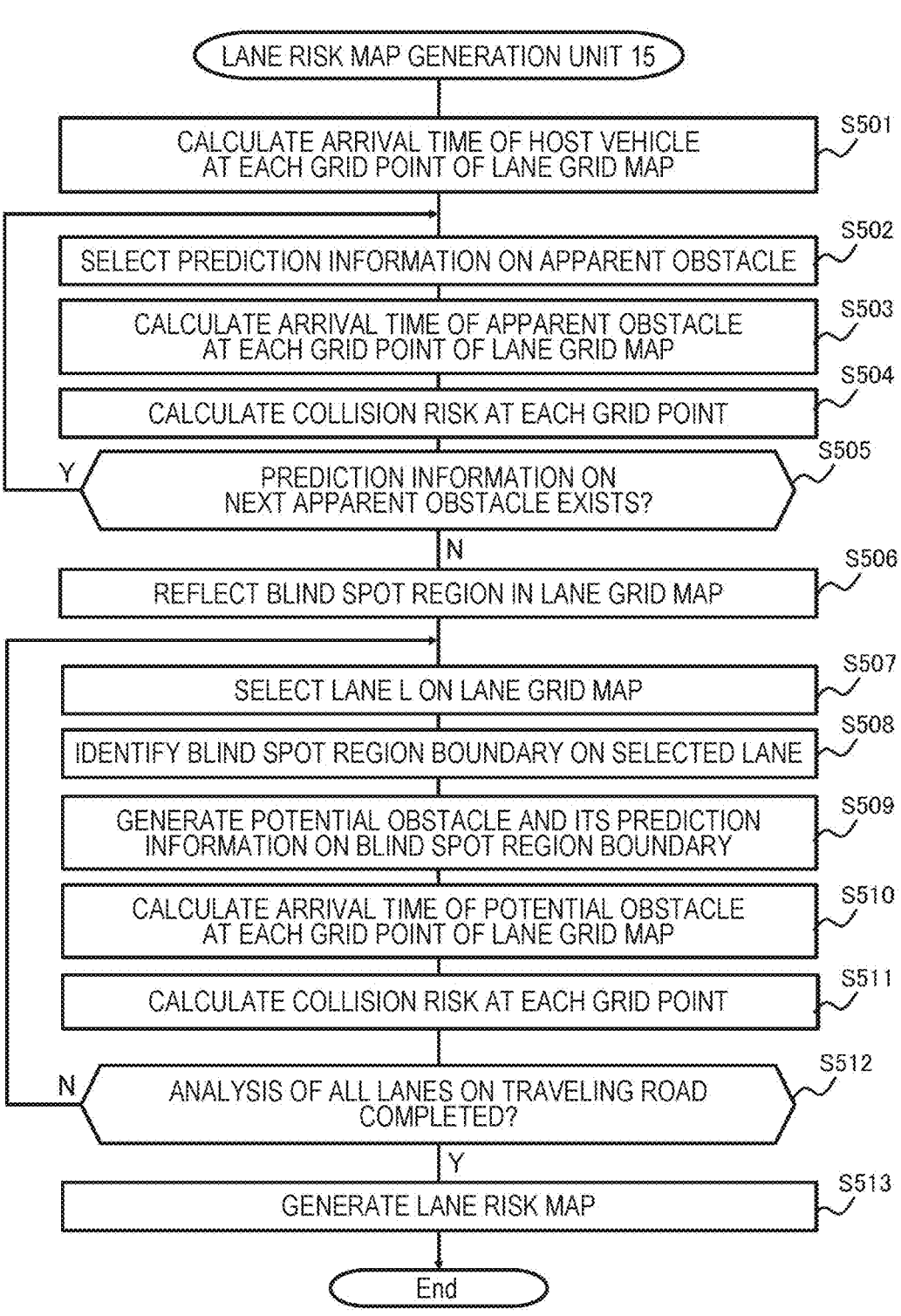
FIG. 5 is a flowchart for explaining processing executed by a lane risk map generation unit.

FIG. 5 is a flowchart for explaining a process executed by the lane risk map generation unit 15 of the vehicle control device 3.

First, in step S501, the lane risk map generation unit 15 calculates the arrival time of the vehicle 2 at each grid point of the lane grid map on the basis of the vehicle information data group 31 acquired by the information acquisition unit 11 and the lane grid map data group 36 generated by the lane grid map generation unit 14. Here, the arrival time to each grid point when the vehicle 2 travels toward each grid on the lane grid map is calculated from the position information, the speed information, and the like of the vehicle 2 indicated by the vehicle information data group 31.

Note that, as described above in the description of FIG. 3, in a case where there is a difference in the path length between the lanes due to a difference in the shape of each lane corresponding to the curve of the road, the distance between the respective grid points in the lane grid map after the normalization processing may be different from the actual distance on the traveling road. In such a case, it is necessary to generate the lane risk map in consideration of the distance deviation between the respective grid points in the extension direction for each lane. Therefore, in step S501, for example, an along-the-road distance when the vehicle 2 follows the grid point on the lane is calculated from the x-y coordinates of each grid point included in the lane grid map data group 36, and an arrival time to each grid point of the vehicle 2 is calculated from the along-the-road distance and information on the current position and traveling speed of the vehicle 2. With this processing, the distance between the respective grid points on the lane grid map can be corrected on the basis of the difference in the path length for each lane, and the collision risk at each grid point can be calculated on the basis of the corrected distance.

For example, when the road of two lanes is curved, the distances from the current position of the vehicle 2 to the grid points on both lanes appear to be the same on the lane grid map. However, in step S501, the arrival time of the vehicle 2 at each grid point is calculated such that the arrival time to the grid point on the lane inside the curve becomes relatively short, and conversely, the arrival time to the grid point on the lane outside the curve becomes relatively long.

By such a calculation method, even when a grid-like grid map is used, the arrival time to each grid point on each lane can be accurately calculated.

Subsequently, in step S502, the lane risk map generation unit 15 selects any one piece of prediction information of the apparent obstacle from among a plurality of pieces of prediction information of the apparent obstacle indicated by the apparent obstacle prediction data group 34 generated by the apparent obstacle prediction unit 12. Then, the selection result is delivered to the next step S503.

Subsequently, in step S503, the lane risk map generation unit 15 calculates the time when the apparent obstacle arrives at each grid point on the lane grid map on the basis of the lane grid map data group 36 generated by the lane grid map generation unit 14 and the prediction information of the apparent obstacle selected in step S502. For example, the arrival time of the apparent obstacle to each grid point can be calculated using the prediction information (position, traveling speed, etc.) of the apparent obstacle and the along-the-road distance obtained from the x-y coordinates of each grid point as in step S501. Note that, unlike step S501, it is not necessary to calculate the arrival time to all the grid points in step S503, and it is sufficient that the presence or absence of the possibility that the apparent obstacle will travel is determined for each lane from the prediction information of the apparent obstacle, and only the arrival time to each grid point on the lane determined to be likely is calculated.

Subsequently, in step S504, the lane risk map generation unit 15 compares the arrival time information of the vehicle 2 to each grid point obtained in step S501 with the arrival time information of the apparent obstacle to each grid point obtained in step S503 to calculate the collision risk between the vehicle 2 and the apparent obstacle. For example, it is assumed that there is a risk of collision at a grid point where the arrival time of the vehicle 2 and the arrival time of the apparent obstacle overlap with each other, and the collision risk for the corresponding grid point is calculated from the degree of the overlap. At this time, in order to analyze the overlap in time between the vehicle 2 and the apparent obstacle, for example, the arrival time to each grid point may be calculated in consideration of geometric information (length or the like) of the vehicle 2 and the apparent obstacle. Specifically, for example, it is desirable to calculate the collision risk by obtaining time widths in which the vehicle 2 and the apparent obstacle exist at each grid point by obtaining entry start time points and end time points to each grid point and comparing the degrees of overlap between the time widths.

Subsequently, in step S505, the lane risk map generation unit 15 determines whether or not there is prediction information on an apparent obstacle to be selected next in the apparent obstacle prediction data group 34 generated by the apparent obstacle prediction unit 12. When prediction information of an unselected apparent obstacle is included in the apparent obstacle prediction data group 34, it is determined that there is prediction information of an apparent obstacle to be selected next, the process returns to step S502, and the processing of steps S502 to S505 is repeated to calculate a collision risk for the next apparent obstacle. On the other hand, when the prediction information of all the apparent obstacles has been selected in the apparent obstacle prediction data group 34, the process moves to step S506.

Subsequently, in step S506, the lane risk map generation unit 15 collates the blind spot region data group 35 representing the blind spot region identified by the blind spot region identification unit 13 with the lane grid map data group 36. As a result, when any of the grid points is in the blind spot region on the lane grid map, the blind spot region is reflected on the lane grid map by recording information of the grid point in association with the lane grid map. For example, the blind spot region may be expressed by a risk value set for each grid point, or the blind spot region may be expressed by a flag or the like attached for each grid point.

Subsequently, in step S507, the lane risk map generation unit 15 selects any one of the lanes included in the traveling road of the vehicle 2 in the lane grid map data as the lane L to be analyzed. Here, for example, the lane L to be analyzed is selected by sequentially selecting the lane IDs included in the lane grid map data group 36 one by one and delivering the selection result to step S508.

Subsequently, in step S508, the lane risk map generation unit 15 searches for a boundary point of the blind spot region existing on the lane L selected in step S507 on the basis of the blind spot region reflected on the lane grid map in step S506. The boundary point of the blind spot region is a point considered to be closest to the boundary (blind spot region boundary) between the blind spot region and the non-blind spot region among the grid points existing in the blind spot region on the lane L. For example, as a result of sequentially searching for grid points along the extension direction of the lane, when a certain grid point is in a blind spot region and the next point is in a non-blind spot region, the former grid point is treated as a boundary point of the blind spot region. In addition, in a case where a certain grid point is in the non-blind region and the next point is in the blind spot region, the latter grid point is treated as a boundary point of the blind spot region. For example, in this manner, the boundary point corresponding to the blind spot region boundary can be identified on the lane L.

Subsequently, in step S509, the lane risk map generation unit 15 virtually generates a potential obstacle on the boundary of the blind spot region on the basis of the boundary point of the blind spot region identified in step S508, and generates prediction information regarding the behavior of the potential obstacle. Here, in consideration of the possibility that the potential obstacle will jump out from the blind spot region toward the vehicle 2, for example, the position, geometry, jumping speed, traveling lane, and the like of the potential obstacle are predicted, and prediction information indicating these prediction results is generated. At this time, for example, by referring to the road environment data group 32, the regulation content (traveling speed limit, orientation direction, etc.) of the road on which the vehicle 2 is traveling may be acquired, and the behavior of the potential obstacle may be predicted based on the acquired regulation content.

Subsequently, in step S510, the lane risk map generation unit 15 calculates the time when the potential obstacle arrives at each grid point on the lane grid map on the basis of the lane grid map data group 36 generated by the lane grid map generation unit 14 and the prediction information of the potential obstacle generated in step S509. Here, the arrival time of the potential obstacle to each grid point can be calculated by a method similar to step S503. However, since it is not possible to identify when the potential obstacle will jump out of the blind spot region, it is preferable to calculate the arrival time of the potential obstacle with a range.

Subsequently, in step S511, the lane risk map generation unit 15 compares the arrival time information of the vehicle 2 to each grid point obtained in step S501 with the arrival time information of the potential obstacle to each grid point obtained in step S510, and calculates the collision risk between the vehicle 2 and the potential obstacle. Here, the collision risk of each grid point can be calculated by a method similar to step S504.

Subsequently, in step S512, the lane risk map generation unit 15 checks whether or not the analysis by the processing in steps S507 to S511 has been completed for all the lane IDs included in the lane grid map data group 36. If there is an unanalyzed lane ID, the process returns to step S507, and the process of steps S507 to S511 is repeated to analyze the next lane ID. On the other hand, when all the lane IDs have been analyzed in the lane grid map data group 36, the process moves to step S513.

Finally, in step S513, the lane risk map generation unit 15 generates a lane risk map using the collision risk for the apparent obstacle calculated in step S504, the blind spot region reflected in step S506, and the collision risk for the potential obstacle calculated in step S511. Here, by combining the processing results of steps S504, S506, and S511 at each grid point of the lane grid map, a lane risk map including information on a collision risk between the vehicle 2 and an apparent obstacle or a potential obstacle, information on a blind spot region that cannot be recognized by the external sensor group 4 around the vehicle 2, and the like is generated with the same configuration as the lane grid map. As a result, it is possible to generate a lane risk map representing the collision risk between the vehicle 2 and the obstacle for each lane of the road.

When a plurality of pieces of risk information and the like exist at one grid point, for example, the risk information to be expressed on the lane risk map may be selected according to the reflection priority of various types of information. An example thereof will be described below.

First, the highest priority is assigned to the risk of collision with an apparent obstacle. Therefore, even when other risk information is created at the same grid point, information on a collision risk with an apparent obstacle is reflected on the grid point. Next, the blind spot region information is assigned the next highest priority of the risk of collision with an apparent obstacle. Finally, the risk of collision with a potential obstacle is assigned the lowest priority. As a result, each piece of risk information can be reflected in the lane risk map in accordance with the priority.

Alternatively, the risk information to be reflected in the lane risk map may be selected by another method. For example, the blind spot region information and the risk of collision with a potential obstacle can be regarded as representing uncertain risk information, that is, potential risk information and handled. In that case, for example, the risk of collision with an apparent obstacle has the highest priority, and thus, at a grid point having a risk of collision with an apparent obstacle, other potential risk information may be necessarily overwritten with the risk information.

Upon completion of step S513, the lane risk map generation unit 15 records the lane risk map generated in step S513 in the lane risk map data group 37 of the storage unit 30, and ends the processing illustrated in the flowchart of FIG. 5.
(Operation Example of Lane Risk Map Generation Unit)

Next, a specific operation example of the processing of the lane risk map generation unit 15 described in the flowchart of FIG. 5 will be described with reference to FIGS. 6 to 7.

Figure 6:
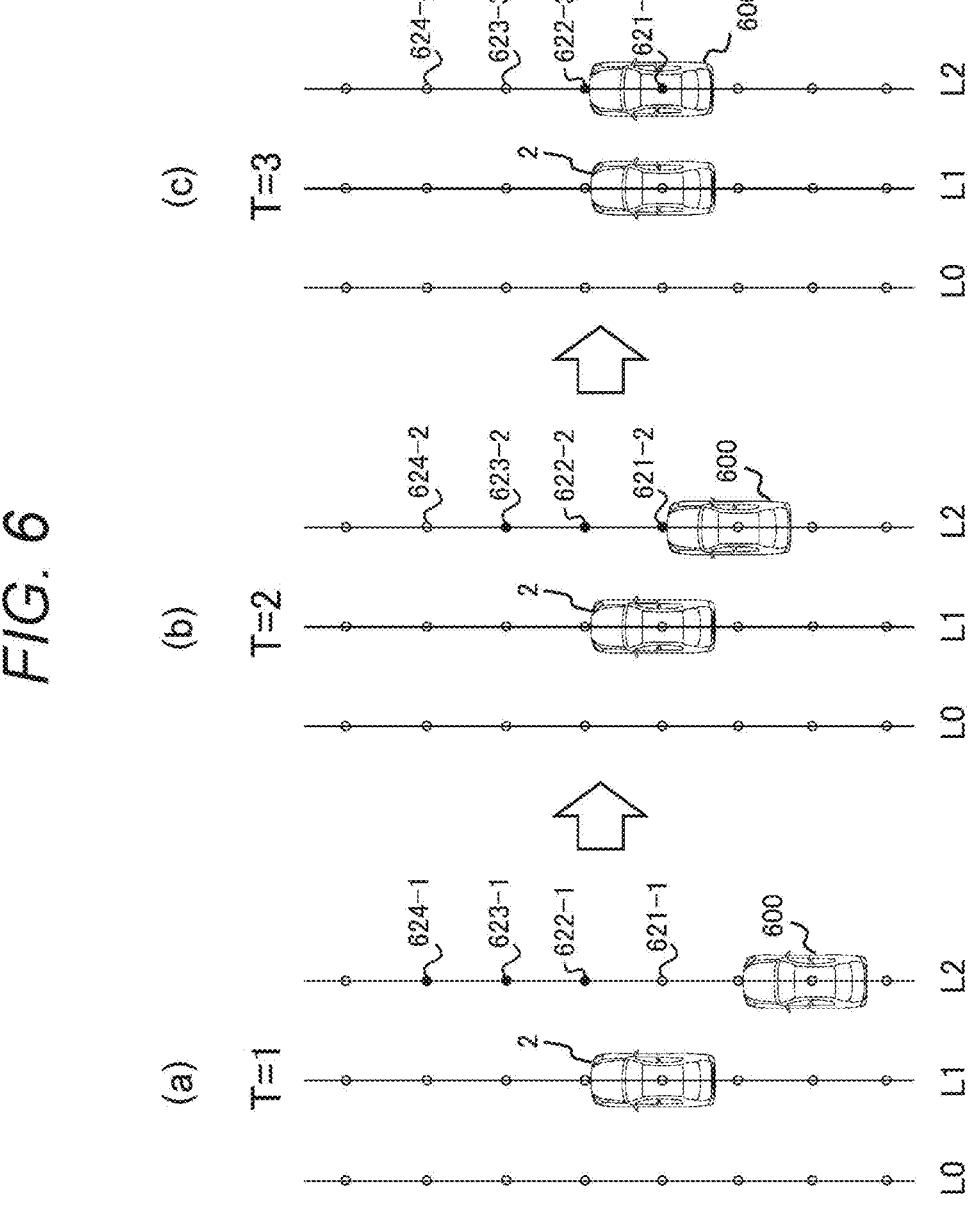
FIG. 6 is a diagram illustrating a specific example of collision risk calculation processing with an apparent obstacle.

FIG. 6 is a diagram illustrating a specific example of collision risk calculation processing with an apparent obstacle performed in steps S501 to S505 described in FIG. 5. FIG. 6 illustrates an example in which a road on which the host vehicle 2 and another vehicle 600 as an apparent obstacle travel is represented by a lane grid map. FIGS. 6(*a*), 6(*b*), and 6(*c*) illustrate positional relationships between the host vehicle 2 and the other vehicle 600 on the lane grid map at three timings (T=1, T=2, T=3) in chronological order in a scene where the other vehicle 600 overtakes the host vehicle 2. In this scene, it is assumed that the host vehicle 2 travels forward in lane L1, and that other vehicle 600 travels in lane L2 at a higher speed than the host vehicle 2.

As illustrated in FIG. 6(*a*), at the timing of T=1, another vehicle 600 approaches from behind the host vehicle 2. At this time, first, in step S501, the lane risk map generation unit 15 calculates and stores, for each grid point, the time when the host vehicle 2 arrives at each grid point on each of the lanes L0, L1, and L2 of the road on which the host vehicle 2 is traveling, as the entry start time point and the end time point of the host vehicle 2. Next, in step S502, the lane risk map generation unit 15 selects prediction information of the other vehicle 600 from the apparent obstacle prediction data group 34. Here, information indicating that the other vehicle 600 travels at the same speed as the current speed along the lane L2 is selected as the prediction information of the other vehicle 600. Subsequently, in step S503, the lane risk map generation unit 15 calculates and stores, for each grid point, the time when the other vehicle 600 arrives at each grid point on the lane L2 as the entry start time point and the end time point of the other vehicle 600 in accordance with the prediction information of the other vehicle 600.

Subsequently, in step S504, the lane risk map generation unit 15 compares the entry start time point and the end time point of the host vehicle 2 and the other vehicle 600 stored in steps S501 and S503, respectively, for each grid point, and stores a grid point where periods from the entry start time point to the end time point overlap each other as a grid point having a risk of collision with an apparent obstacle. In FIG. 6(*a*), grid points having a risk of collision with an apparent obstacle are indicated by black dots 622-1 to 624-1. That is, the time when the host vehicle 2 arrives at each of the grid points 622-1, 623-1, and 624-1 on the lane L2 when the lane change is performed and the time when the other vehicle 600 arrives at these grid points overlap each other.

As illustrated in FIG. 6(*a*), when the other vehicle 600 is away from the host vehicle 2, the time until the other vehicle 600 collides with the host vehicle 2 becomes long, and thus, grid points having a risk of collision with an apparent obstacle are calculated mainly in front of the host vehicle 2. On the other hand, as illustrated in FIG. 6(*b*), when the other vehicle 600 further approaches the host vehicle 2 at the timing T=2, the time until the other vehicle 600 collides with the host vehicle 2 is shortened, and thus, grid points having a risk of collision with an apparent obstacle are mainly calculated with respect to the side of the host vehicle 2. That is, in FIG. 6(*a*), the grid point 624-1 far from the host vehicle 2 is calculated as a grid point having a risk of collision with an apparent obstacle, whereas in FIG. 6(*b*), the grid point 624-2 far from the host vehicle 2 is a grid point having no risk of collision. In addition, in FIG. 6(*a*), the grid point 621-1 on the side of the host vehicle 2 is a grid point having no collision risk, whereas in FIG. 6(*b*), the grid point 621-2 on the side of the host vehicle 2 is calculated as a grid point having a collision risk with an apparent obstacle.

Thereafter, as shown in FIG. 6(*c*), when the other vehicle 600 further approaches the host vehicle 2, the position of the grid point having a collision risk is further limited to the side of the host vehicle 2. Specifically, in FIG. 6(*c*), only the grid points 621-3 and 622-3 on the side of the host vehicle 2 are calculated as grid points having a collision risk, and the grid point 623-3 obliquely in front of the host vehicle 2 is a grid point having no collision risk. As described above, when the positional relationship between the host vehicle 2 and the other vehicle 600 changes, the range of grid points at which the periods from the entry start time point to the end time point of the host vehicle 2 and the other vehicle 600 overlap changes accordingly, so that the region having a collision risk on the lane grid map changes.

Finally, in step S505 of FIG. 5, the lane risk map generation unit 15 checks whether or not prediction information on other apparent obstacles other than the other vehicle 600 exists in the lane risk map generation unit 15, that is, whether or not other apparent obstacles exist. In the scene of FIG. 6, since there are no other apparent obstacles, the collision risk information generated here is used in the processing of the next and subsequent steps.

Figure 7:
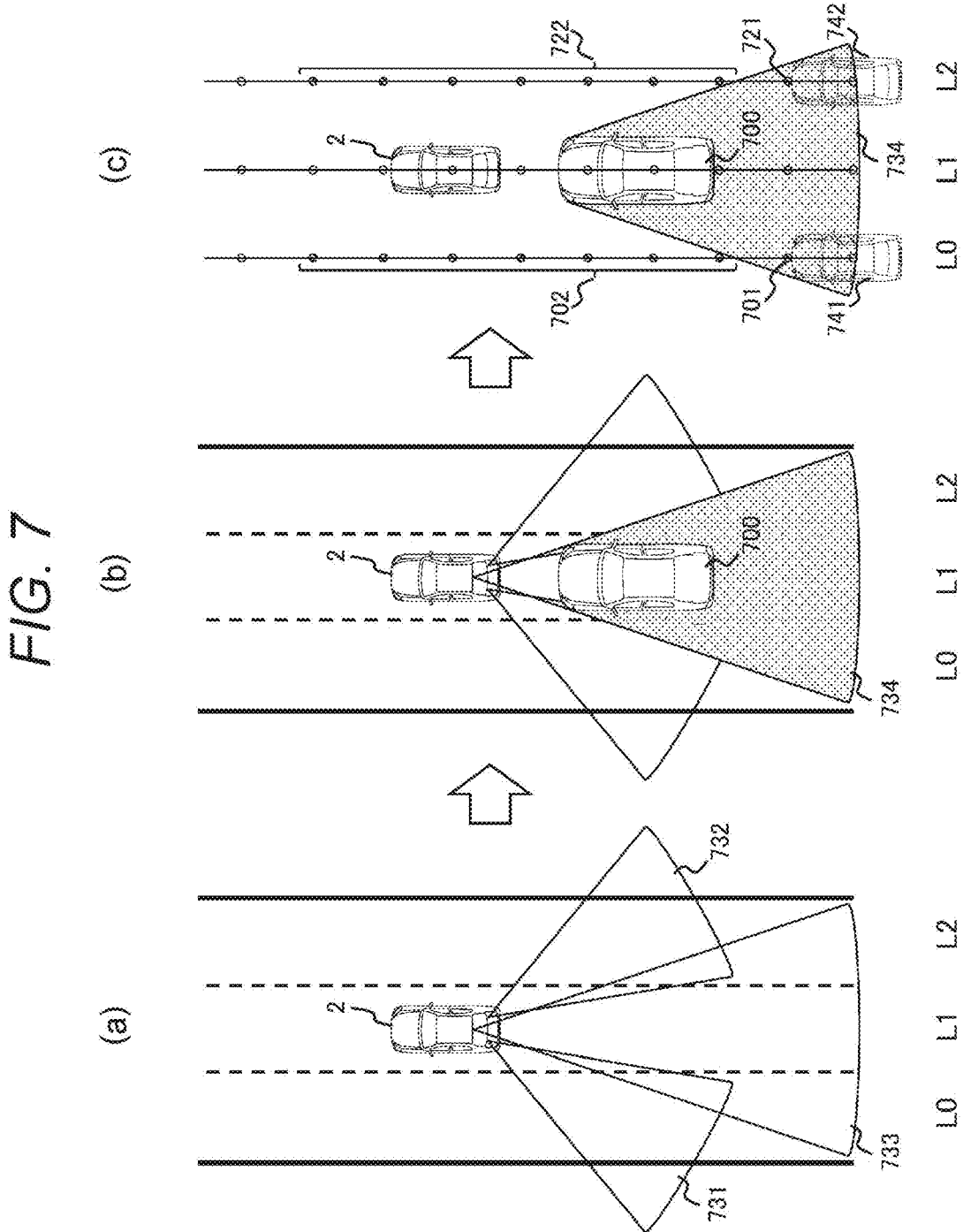
FIG. 7 is a diagram illustrating a specific example of collision risk calculation processing with a potential obstacle.

FIG. 7 is a diagram illustrating a specific example of collision risk calculation processing with a potential obstacle performed in steps S506 to S512 described in FIG. 5. In FIG. 7, FIGS. 7(*a*) and 7(*b*) are diagrams for explaining a scene of this example, and FIG. 7(*c*) is a diagram for explaining steps S506 to S512. Therefore, FIGS. 7(*a*) and 7(*b*) illustrate the traveling road environment of the host vehicle 2 using the actual road shape around the host vehicle 2. On the other hand, in FIG. 7(*c*), the traveling road environment of the host vehicle 2 is illustrated using the lane grid map generated for each lane of the road on which the host vehicle 2 is traveling. In addition, in FIG. 7, by using a scene different from that in FIG. 6 described above, it will be described that the external sensor group 4 cannot recognize the rear side of the lane next to the traveling lane of the host vehicle 2 and the rear side is a blind spot region, and the risk of a potential obstacle jumping out of this blind spot region is calculated.

FIG. 7(*a*) is a diagram illustrating an example of a state in which a road region behind the host vehicle 2 is detected by the external sensor group 4. When the host vehicle 2 is traveling on the center lane L1 on the road including the three lanes L0, L1, and L2, the recognition range of the rear by the external sensor group 4 mounted on the host vehicle 2 is indicated by, for example, rear recognition regions 731, 732, and 733. In this case, it can be confirmed that the state of the lane L1 on which the host vehicle 2 is traveling and the left and right adjacent lanes L0 and L2 can be roughly recognized by the external sensor group 4 behind the host vehicle 2.

FIG. 7(*b*) is a diagram illustrating a state in which another vehicle 700 is traveling behind the host vehicle 2 as an apparent obstacle on the lane L1 in the same sensor recognition range as that in FIG. 7(*a*). In this case, most of the rear recognition region 733 and a part of the rear recognition regions 731 and 732 are blocked by the other vehicle 700, so that the region behind the other vehicle 700 is a blind spot region 734 that cannot be confirmed from the host vehicle 2. That is, the other vehicle 700 can confirm that not only the region behind the lane L1 is a blind spot region, but also the regions behind the adjacent lanes L0 and L2 are blind spot regions.

FIG. 7(*c*) is a diagram illustrating a specific example of the processing of steps S506 to S512 of FIG. 5. First, in step S506, the lane risk map generation unit 15 reflects the blind spot region 734 in the lane grid map. Here, for each grid point in the blind spot region 734, information indicating that the grid point is in the blind spot region is stored. This information may be set by, for example, a risk value, a flag, or the like. Subsequently, in step S507, the lane risk map generation unit 15 selects any one of the lanes L, L1, and L2 as the lane to be analyzed. Subsequently, in step S508, the lane risk map generation unit 15 identifies a grid point located at the boundary of the blind spot region 734 in the lane selected in step S507 as a blind spot region boundary point. In the case of FIG. 7(*c*), in the lanes L0 and L2, the grid points 701 and 721 are identified as blind spot region boundary points of the blind spot region 734.

Subsequently, in step S509, the lane risk map generation unit 15 generates, on the basis of the blind spot region boundary points 701 and 721, information on the virtual vehicles 741 and 742 representing potential obstacles that may jump out of the blind spot region 434. Specifically, for example, the virtual vehicles 741 and 742 are virtually arranged at positions of the blind spot region boundary points 701 and 721, respectively, and these pieces of travel information (traveling lane, vehicle speed, etc.) are further generated on the basis of road regulation information or the like indicated by the road environment data group 32.

Subsequently, in step S510, the lane risk map generation unit 15 calculates the arrival times of the virtual vehicles 741 and 742 at each grid point on the basis of the travel information of the virtual vehicles 741 and 742 generated in step S509. For example, when the virtual vehicle 741 and the virtual vehicle 742 travel on the lane L0 and the lane L2, respectively, in the same direction as that of the host vehicle 2, the times when the virtual vehicles 741 and 742 arrive at the grid points of the lanes L0 and L2 are calculated as the entry start time points and the end time points of the virtual vehicle 741 and 742, respectively, using the vehicle speeds set for the virtual vehicles 741 and 742.

Subsequently, in step S511, the lane risk map generation unit 15 compares the arrival time information of the host vehicle 2 calculated in step S501 with the arrival time information of the virtual vehicles 741 and 742 calculated in step S510 for each grid point. Then, in front of the blind spot region boundary points 701 and 721 where the virtual vehicles 741 and 742 are arranged, respectively, each grid point where the periods from the entry start time point to the end time point overlap between the host vehicle 2 and the virtual vehicles 741 and 742 is stored as a grid point at which there is a risk of collision with a potential obstacle. As a result, each grid point 702 on the lane L0 and each grid point 722 on the lane L2 are stored as grid points at which there is a risk of collision with a potential obstacle. Note that, since one lane is selected at a time as the lane to be analyzed in step S507, the processing in the lane L0 and the processing in the lane L2 are performed in different processing cycles.

Finally, in step S512, the lane risk map generation unit 15 checks whether or not the lane selected in step S507 is the last lane in the traveling road of the host vehicle 2. When there is no unselected lane on the traveling road of the host vehicle 2, it is determined that the lane is the last lane, and the process proceeds to step S513. When there is an unselected lane on the traveling road of the host vehicle 2, it is determined that the lane is not the last lane, and the process returns to step S507 to select the next lane to be analyzed.

The lane risk map generation unit 15 generates the collision risk of the apparent obstacle and the potential obstacle at each grid point of the lane grid map and the blind spot information by the above-described processing described with reference to FIGS. 6 and 7. Then, as described in step S513 of FIG. 5, these pieces of information are finally combined to generate and store the lane risk map data group 37.

The specific processing of the lane risk map generation unit 15 executed by the vehicle system 1 of the present embodiment has been described above.

(Flow of Travel Control Plan Processing)

Figure 8:
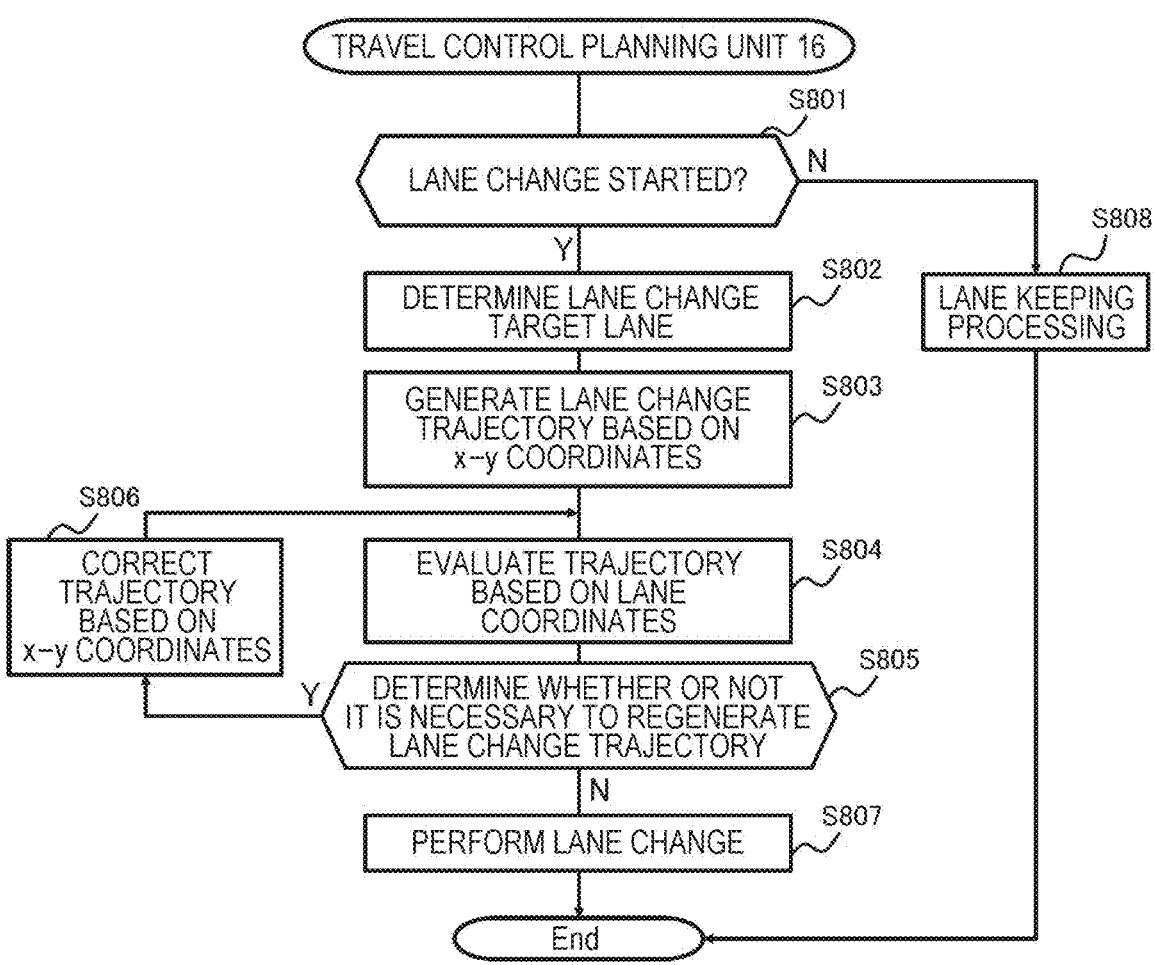
FIG. 8 is a flowchart for explaining processing executed by a travel control planning unit.

FIG. 8 is a flowchart for explaining processing executed by the travel control planning unit 16 of the vehicle control device 3.

First, in step S801, the travel control planning unit 16 determines whether the vehicle 2 starts a lane change or keeps the current traveling lane on the basis of the road environment data group 32 acquired by the information acquisition unit 11, the apparent obstacle prediction data group 34 generated by the apparent obstacle prediction unit 12, and input signals of the driver and the occupant acquired by, for example, the HMI device group 8. If a lane change is performed, the process proceeds to step S802. When the lane change is not performed, the process proceeds to step S808.

Subsequently, in step S802, the travel control planning unit 16 sets a target lane for the vehicle 2 to change lanes on the basis of the road environment data group 32 acquired by the information acquisition unit 11. For example, when the vehicle 2 changes the lane from the current traveling lane to the right adjacent lane, the right adjacent lane is set as the target lane.

Subsequently, in step S803, the travel control planning unit 16 generates a traveling trajectory of the vehicle 2 to the target lane on the basis of the vehicle information data group 31 and the road environment data group 32 acquired by the information acquisition unit 11 and the target lane set in step S802. Here, for example, the traveling trajectory of the vehicle 2 to the target lane can be generated by determining the traveling state (position, vehicle speed, traveling direction, etc.) of the vehicle 2 for several seconds from the present in consideration of the road rules, safety, ride comfort, and the like.

Subsequently, in step S804, the travel control planning unit 16 evaluates the traveling trajectory on the basis of the road environment data group 32 acquired by the information acquisition unit 11, the lane risk map data group 37 generated by the lane risk map generation unit 15, and the traveling trajectory of the vehicle 2 generated in step S803. Here, for example, by collating risk information of each position (grid point) in the extension direction of each lane included in the lane risk map with the traveling trajectory, the degree of risk of the traveling trajectory is evaluated.

Note that, in step 803, a traveling trajectory is generated according to the position on the map expressed by the x-y coordinates, while the lane risk map generation unit 15 generates a lane risk map according to the extension direction (lane coordinates) of each lane. Therefore, in step S804, as described above, it is necessary to compare the position of each grid point of the lane risk map with the position information of the traveling trajectory using the position information of the reference point corresponding to each grid point included in the lane risk map data group 37, that is, the position information on the original map represented by the x-y coordinates and the information such as the lane width included in the road environment data group 32. By such comparison of the position information, it is possible to clearly identify grid points through which the vehicle 2 passes when traveling along the traveling trajectory in the lane risk map.

In addition, in the lane risk map data group 37, a risk state of each lane at a position corresponding to each grid point is represented by a lane risk map. Therefore, when the traveling trajectory is evaluated in step S804, the lane risk map data group 37 may be treated as information expressing not only the location of each grid point but also the risk state in the lane region range having the lane width. In this case, when the vehicle 2 travels along the traveling trajectory and the vehicle body of the vehicle 2 enters the target lane even slightly, the traveling trajectory may be regarded as passing through the grid point of the lane risk map.

When the grid point corresponding to the traveling trajectory can be identified by collating the lane risk map with the traveling trajectory as described above, the traveling trajectory is evaluated using the risk value of the grid point. For example, when the risk state of the grid point corresponding to the traveling trajectory represents a state in which the risk of collision with an apparent obstacle or a potential obstacle is high, the traveling trajectory may be evaluated as the risk of collision with these obstacles. In addition, for example, in a case where a grid point having a risk of collision with a potential obstacle overlaps with the traveling trajectory, an evaluation value of the traveling trajectory may be calculated on the basis of the degree of risk, and the calculation result may be sent to the next step S805. For example, the evaluation value of the traveling trajectory for the potential obstacle can be obtained by setting the evaluation value of the traveling trajectory high when the degree of risk is low and setting the evaluation value of the traveling trajectory low when the degree of risk is high.

Subsequently, in step S805, the travel control planning unit 16 determines whether or not it is necessary to correct the traveling trajectory generated in step S803 on the basis of the evaluation result in step S804. For example, when the evaluation result that the traveling trajectory overlaps with the risk is sent from step S804, it may be determined that the traveling trajectory needs to be corrected. In addition, for example, in a case where the evaluation value of the traveling trajectory sent from step S804 is low, it is conceivable to determine that it is not necessary to correct the traveling trajectory. In addition to simply correcting the lane change trajectory, for example, it is also conceivable to take an action of reducing the degree of risk by the traveling trajectory of the vehicle 2 and increasing the evaluation value. For example, in a case where the traveling trajectory of the vehicle 2 overlaps with a potential risk, it is conceivable to generate a traveling trajectory that improves the field of view of the vehicle 2 and reduces the potential risk, thereby controlling the vehicle 2 to take an action of increasing the evaluation value of the traveling trajectory at the time of lane change.

When it is determined in step S805 that the traveling trajectory needs to be corrected, subsequently in step S806, the travel control planning unit 16 executes correction of the traveling trajectory. Here, after a new candidate for the traveling trajectory is generated as in step S803, the process returns to step S804 in order to evaluate whether or not the candidate for the traveling trajectory passes through the grid point in the risk state again.

If it is determined in step S805 that there is no need to correct the traveling trajectory, finally in step S807, the travel control planning unit 16 changes the lane of the vehicle 2 according to the traveling trajectory generated last in step S803 or S806. Specifically, for example, information on the traveling trajectory is converted into actuator control information and recorded in the travel control data group 38 of the storage unit 30. The actuator control information recorded in the travel control data group 38 is transmitted to the actuator group 7 and used for control of the vehicle 2 performed by the actuator group 7.

On the other hand, when it is determined in step S801 that the lane change is not to be performed, in step S808, the travel control planning unit 16 executes lane keeping pro-cessing for keeping the lane on which the vehicle 2 is currently traveling. Here, a traveling trajectory that keeps traveling in the lane on which the vehicle 2 is currently traveling is generated, including processing for ensuring safety, such as determination of collision with an apparent obstacle.

Upon completion of step S807 or S808, the travel control planning unit 16 ends the processing illustrated in the flowchart of FIG. 8.

(Operation Example of Travel Control Planning Unit)

Next, a specific operation example of the process of the travel control planning unit 16 described in the flowchart of FIG. 8 will be described with reference to FIGS. 9 to 10.

FIG. 9 is a diagram illustrating a specific example of trajectory generation, evaluation, and correction in the processing of FIG. 8. FIG. 9 illustrates a scene in which, when the host vehicle 2 tries to change the lane from the lane L1 to the lane L2, another vehicle 900, which is an apparent obstacle traveling on the lane L2, approaches from behind and may collide with the host vehicle 2 at the time of the lane change. Hereinafter, each process of trajectory generation, evaluation, and correction will be described using specific examples of FIGS. 9(a), 9(b), and 9(c).

In steps S801, S802, and S803 of FIG. 8, the travel control planning unit 16 determines the target lane when the host vehicle 2 performs the lane change on the basis of the road environment information around the host vehicle 2 indicated by the road environment data group 32, the behavior information of the host vehicle 2 indicated by the vehicle information data group 31, and the information of the apparent obstacle indicated by the apparent obstacle prediction data group 34. Specifically, for example, as illustrated in FIG. 9(a), the target lane after the lane change for the host vehicle 2 traveling on the lane L1 is determined as a lane L2, and a lane change trajectory 931 from the lane L1 to the lane L2 is generated.

Next, in step S804, the travel control planning unit 16 compares the lane change trajectory 931 with each grid point of the lane risk map, and evaluates the lane change trajectory 931. Specifically, for example, as illustrated in FIG. 9(b), it is evaluated whether or not the lane change trajectory 931 overlaps with the grid points 921 to 923 indicated in the lane risk map that there is a collision risk with the host vehicle 2 with respect to a future predicted trajectory of the other vehicle 900. At this time, width information of the host vehicle 2 and the lane L2 may be used. As a result, when the host vehicle 2 travels along the lane change trajectory 931, the distance between the host vehicle 2 and the grid point 923 is less than the predetermined value in the region 940 in the drawing, so that it can be confirmed that the host vehicle 2 travels on the grid point 923. This means that the host vehicle 2 may collide with the other vehicle 900.

Subsequently, in step S805, the travel control planning unit 16 determines that it is necessary to correct the lane change trajectory 931, and performs correction processing of the lane change trajectory 931 in step S806. As a result, for example, as illustrated in FIG. 9(c), a new lane change trajectory 932 is generated instead of the lane change trajectory 931.

Note that, in the above description using FIG. 9, it is difficult to intuitively understand that collision with another vehicle 900 is avoided by the host vehicle 2 traveling along the corrected lane change trajectory 932. Therefore, in the following, by describing a specific movement of the host vehicle 2 with reference to FIG. 10, it will be described that the host vehicle 2 can avoid collision with another vehicle 900 by the corrected lane change trajectory 932.

Figure 10:
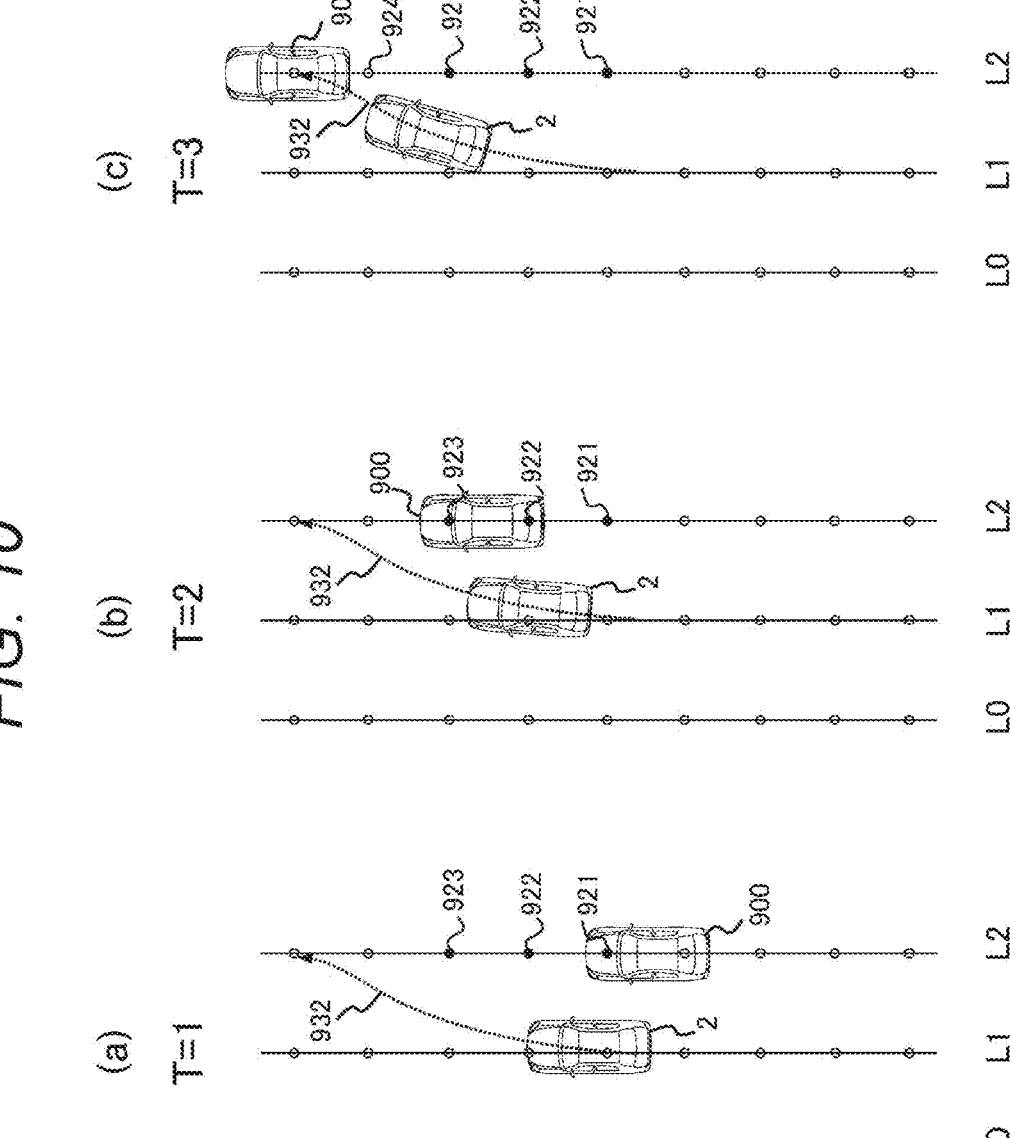
FIG. 10 is a diagram illustrating an example of a scene when the host vehicle is caused to change lanes according to the corrected lane change trajectory.

FIG. 10 is a diagram illustrating an example of a scene when the host vehicle 2 is caused to change lanes in accordance with the corrected lane change trajectory 932 illustrated in FIG. 9(*c*). FIGS. 10(*a*), 10(*b*), and 10(*c*) illustrate the states in which the host vehicle 2 and the other vehicle 900 move at each timing of T=1, T=2, and T=3, respectively, while fixing the collision risk between the corrected lane change trajectory 932 and each grid point.

FIG. 10(*a*) illustrates an example of the positional relationship between the host vehicle 2 and the other vehicle 900 at the timing of T=1. In this example, the host vehicle 2 starts moving along the lane change trajectory 932, and the other vehicle 900 approaches the vehicle 2 in the extension direction of the lane L2. At this time, the host vehicle 2 continues traveling on the lane L1 without starting to move to the lane L2 according to the lane change trajectory 932, thereby waiting for passage of the other vehicle 900 while avoiding the grid points 921 to 923 having a collision risk.

FIG. 10(*b*) illustrates an example of the positional relationship between the host vehicle 2 and the other vehicle 900 at the timing of T=2. In this example, the other vehicle 900 moves further forward than the timing of T=1 and moves beyond the host vehicle 2. At the same time, the host vehicle 2 starts to move from the lane L1 to the lane L2 little by little along the lane change trajectory 932, but does not collide with the other vehicle 900 because the host vehicle 2 has avoided the grid points 921 to 923 having a collision risk.

FIG. 10(*c*) illustrates an example of the positional relationship between the host vehicle 2 and the other vehicle 900 at the timing of T=3. In this example, the other vehicle 900 has completed overtaking of the host vehicle 2. At this time, since the host vehicle 2 can avoid a collision with the other vehicle 900, the host vehicle 2 moves to the lane L2 in the region behind the other vehicle 900 and enters the grid point 924 where there is no collision risk. When the host vehicle 2 continues to travel along the lane change trajectory 932, it is possible to complete the lane change to the lane L2 without colliding with the other vehicle 900.

The specific processing of the travel control planning unit 16 executed by the vehicle system 1 of the present embodiment has been described above. In a vehicle control device 3 which is an ECU mounted on a vehicle 2, the lane risk map data group 37 generated by the lane risk map generation unit 15 expresses a risk state for each position in an extension direction of each lane of a road on which the vehicle 2 is traveling. With such an expression, when the travel control planning unit 16 performs travel trajectory evaluation (processing in step S804 in FIG. 8), the traveling trajectory can be evaluated only by comparing with the risk state stored in each grid point of the lane risk map data group 37. Therefore, the calculation amount necessary for evaluating the traveling trajectory in the vehicle control device 3 can be greatly suppressed.

According to the embodiment of the present invention described above, the following operational effects are obtained.

(1) The vehicle control device 3 mounted on the host vehicle 2 includes an information acquisition unit 11, an apparent obstacle prediction unit 12, and a lane risk map generation unit 15. The information acquisition unit 11 acquires a vehicle information data group 31 representing vehicle information on the behavior of the host vehicle 2, a road environment data group 32 representing road environment information on the environment of the road on which the host vehicle 2 is traveling, and a sensor recognition data group 33 representing sensor recognition information on the surrounding environment of the host vehicle 2 recognized by the external sensor group 4 mounted on the host vehicle 2. Based on the road environment data group 32 and the sensor recognition data group 33, the apparent obstacle prediction unit 12 predicts the future behavior of the apparent obstacle that may hinder the traveling of the host vehicle 2. The lane risk map generation unit 15 generates a lane risk map representing the collision risk between the host vehicle 2 and the obstacle for each lane of the road on the basis of the vehicle information data group 31 and the future behavior of the apparent obstacle predicted by the apparent obstacle prediction unit 12. With this configuration, the traveling risk of the host vehicle can be appropriately evaluated regardless of the number of surrounding vehicles.

(2) The vehicle control device 3 includes a lane grid map generation unit 14 that generates a lane grid map having a plurality of grid points set at equal intervals on a plurality of straight lines representing each lane of the road on the basis of the vehicle information data group 31 and the road environment data group 32. The lane risk map generation unit 15 generates a lane risk map by calculating a collision risk at each grid point of the lane grid map (step S504, S511). With this configuration, the lane risk map can be generated in a format suitable for the evaluation of the traveling trajectory.

(3) When generating the lane grid map, the lane grid map generation unit 14 performs normalization processing of changing intervals between positions corresponding to a plurality of grid points on each lane of the road for each lane according to a difference in path length between the lanes due to a difference in shape of each lane of the road. Specifically, for example, as described with reference to FIG. 3, the normalization processing includes a process of setting a plurality of representative points at equal intervals on the traveling lane of the host vehicle on the road, a process of setting a plurality of straight lines that are orthogonal to an extension direction of the traveling lane at the plurality of set representative points, respectively, and pass through the plurality of representative points, respectively; a process of setting intersections between the plurality of set straight lines and each lane of the road excluding the traveling lane as a plurality of reference points respectively corresponding to the plurality of representative points; and a process of recording position information of the representative point and the reference point in association with each grid point of the lane grid map. With this configuration, even when there is a difference in path length between the lanes of the road due to, for example, the curve of the road, each lane of the road can be accurately represented on the lane grid map.

(4) The lane risk map generation unit 15 corrects the distance between the grid points of the lane grid map on the basis of the difference in the path length between the lanes (steps S501, S503, and S510), and calculates the collision risk on the basis of the corrected distance (steps S504 and S511). With this configuration, the collision risk at each grid point can be appropriately calculated even when there is a difference in path length between the lanes of the road due to, for example, the curve of the road.

(5) The vehicle control device 3 includes a blind spot region identification unit 13 that identifies a blind spot region that cannot be recognized by the external sensor group 4 around the host vehicle 2. The lane risk map generation unit 15 predicts a potential obstacle that may appear from a blind spot region (step S509), and generates a lane risk map on the basis of the vehicle information data group 31, future behavior of an apparent obstacle, and a prediction result of the potential obstacle (step S513). With this configuration, it is possible to generate a lane risk map with higher safety in further consideration of jumping out of an obstacle from a blind spot region that cannot be recognized by the external sensor group 4.

(6) The vehicle control device 3 includes a lane grid map generation unit 14 that generates a lane grid map having a plurality of grid points set at equal intervals on a plurality of straight lines representing each lane of the road on the basis of the vehicle information data group 31 and the road environment data group 32. The lane risk map generation unit 15 calculates a collision risk (first collision risk) between the host vehicle and an apparent obstacle at each grid point on the lane grid map and a collision risk (second collision risk) between the host vehicle and a potential obstacle at each grid point on the lane grid map, and generates a lane risk map on the basis of the calculation results of the first and second collision risks. Specifically, the lane risk map generation unit 15 calculates arrival times of the host vehicle, the apparent obstacle, and the potential obstacle at each grid point on the lane grid map (steps S501, S503, and S510). Then, the first collision risk is calculated by comparing the arrival time of the host vehicle with the arrival time of the apparent obstacle (step S504), and the second collision risk is calculated by comparing the arrival time of the host vehicle with the arrival time of the potential obstacle (step S511). With this configuration, it is possible to generate the lane risk map appropriately representing the collision risk with the obstacles around the host vehicle in consideration of both the apparent obstacle that can be recognized by the external sensor group 4 and the potential obstacle from the blind spot region that cannot be recognized by the external sensor group 4.

Note that the embodiment described above is an example, and the present invention is not limited thereto. That is, various applications are possible, and all embodiments are included in the scope of the present invention.

For example, although an example of the lane change is shown in the above embodiment, the present invention is also applicable at the time of other driving behaviors, for example, lane merging, overtaking an apparent obstacle, and the like.

For example, in the above embodiment, an example in which the center line information of the lane used when the lane grid map generation processing is performed is acquired from the road environment data group 32 has been described in FIG. 3(b), but there is a case where this cannot be acquired. In this case, for example, an additional calculation of the lane center line based on the lane boundary information, the travelable region, and the like may be performed, and the center line information of the lane may be acquired from the calculation result.

For example, in the above embodiment, an example has been described in which the lane risk map generation unit 15 acquires road regulation information from the road environment data group 32 and generates prediction information of a potential obstacle on the basis of the road regulation information, but the road regulation information may be acquired by any other means. For example, the map information of the current traveling region of the vehicle 2 may be acquired from the map information management device

6, and the prediction information of the potential obstacle may be generated based on the speed limit information included in the map information or the like. Alternatively, the prediction information of the potential obstacle may be generated based on a sign or signal information recognized by the external sensor group 4. Alternatively, the prediction information of the potential obstacle can be generated by any method.

REFERENCE SIGNS LIST

1 vehicle system
2 vehicle
3 vehicle control device
4 external sensor group
5 vehicle sensor group
6 map information management device
7 actuator group
8 HMI device group
9 external communication device
10 processing unit
11 information acquisition unit
12 apparent obstacle prediction unit
13 blind spot region identification unit
14 lane grid map generation unit
15 lane risk map generation unit
16 travel control planning unit
17 information output unit
30 storage unit
31 vehicle information data group
32 road environment data group
33 sensor recognition data group
34 apparent obstacle prediction data group
35 blind spot region data group
36 lane grid map data group
37 lane risk map data group
38 travel control data group
40 communication unit

The invention claimed is:

1. A vehicle control device mounted on a host vehicle, the vehicle control device comprising:

one or more sensors mounted on the host vehicle and configured to recognize a surrounding environment of the host vehicle; and a processor configured to:

acquire vehicle information regarding a behavior of the host vehicle, road environment information regarding an environment of a road on which the host vehicle is traveling, and sensor recognition information regarding the surrounding environment of the host vehicle;

predict a future behavior of an apparent obstacle that is determined to obstruct traveling of the host vehicle on a basis of the road environment information and the sensor recognition information;

generate a lane grid map having a plurality of grid points set at equal intervals on a plurality of straight lines representing each lane of the road on a basis of the vehicle information and the road environment information;

generate a lane risk map representing a collision risk between the host vehicle and an obstacle for each lane of the road on a basis of the vehicle information and the predicted future behavior of the apparent obstacle, by calculating the collision risk at each grid point of the lane grid map; and control an actuator to cause the host vehicle to follow a trajectory based on the lane risk map, wherein the lane grid map is generated based on normalization processing of changing intervals between positions respectively corresponding to the plurality of grid points on each lane of the road for each lane according to a difference in a path length between lanes due to a difference in a shape of each lane of the road.

2. The vehicle control device according to claim 1, wherein the normalization processing includes:

setting a plurality of representative points on a traveling lane of the host vehicle on the road at equal intervals;

setting a plurality of straight lines that are orthogonal to an extension direction of the traveling lane at the plurality of representative points respectively and pass through the plurality of representative points, respectively;

setting intersections between the plurality of straight lines and each lane of the road excluding the traveling lane as a plurality of reference points respectively corresponding to the plurality of representative points; and recording position information of the representative point and the reference point in association with each grid point of the lane grid map.

3. The vehicle control device according to claim 1, wherein the processor is further configured to correct a distance between grid points of the lane grid map on a basis of the difference in the path length, and calculate the collision risk on a basis of the corrected distance.

4. The vehicle control device according to claim 1, wherein the processor is further configured to: identify a blind spot region that is not detectable by the one or more sensors around the host vehicle, predict a potential obstacle that is determined to appear from the blind spot region, and generate the lane risk map on a basis of the vehicle information, future behavior of the apparent obstacle, and a prediction result of the potential obstacle.

5. The vehicle control device according to claim 4, wherein the processor is further configured to: generate a lane grid map having a plurality of grid points set at equal intervals on a plurality of straight lines representing each lane of the road on a basis of the vehicle information and the road environment information, calculate a first collision risk between the host vehicle and the apparent obstacle at each grid point on the lane grid map and a second collision risk between the host vehicle and the potential obstacle at each grid point on the lane grid map, and generate the lane risk map on a basis of calculation results of the first and second collision risks.

6. The vehicle control device according to claim 5, wherein the processor is further configured to:

calculate arrival times of the host vehicle, the apparent obstacle, and the potential obstacle at each grid point of the lane grid map, calculate the first collision risk by comparing an arrival time of the host vehicle with an arrival time of the apparent obstacle, and calculate the second collision risk by comparing an arrival time of the host vehicle with an arrival time of the potential obstacle.

* * * * *